United States Patent
Hulton et al.

(10) Patent No.: US 11,609,853 B2
(45) Date of Patent: *Mar. 21, 2023

(54) MEMORY CONTROLLERS INCLUDING EXAMPLES OF CALCULATING HAMMING DISTANCES FOR NEURAL NETWORK AND DATA CENTER APPLICATIONS

(71) Applicant: MICRON TECHNOLOGY, INC., Boise, ID (US)

(72) Inventors: David Hulton, Seattle, WA (US); Jeremy Chritz, Seattle, WA (US); Tamara Schmitz, Scotts Valley, CA (US)

(73) Assignee: Micron Technology, Inc., Boise, ID (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/016,053

(22) Filed: Sep. 9, 2020

(65) Prior Publication Data

US 2022/0075724 A1 Mar. 10, 2022

(51) Int. Cl.
*G06F 12/0802* (2016.01)
*G06F 13/16* (2006.01)

(52) U.S. Cl.
CPC ...... *G06F 12/0802* (2013.01); *G06F 13/1668* (2013.01); *G06F 2212/60* (2013.01); *G06F 2213/0026* (2013.01); *G06F 2213/16* (2013.01)

(58) Field of Classification Search
CPC ............ G06F 12/0802; G06F 13/1668; G06F 2212/60; G06F 2213/0026; G06F 2213/16
See application file for complete search history.

(56) References Cited

U.S. PATENT DOCUMENTS

| 5,050,095 A | 9/1991 | Samad |
| 5,303,328 A | 4/1994 | Masui et al. |

(Continued)

FOREIGN PATENT DOCUMENTS

| JP | 2019101927 A | 6/2019 |
| KR | 20100087269 A | 8/2010 |

(Continued)

OTHER PUBLICATIONS

U.S. Appl. No. 17/016,023 titled "Memory Systems Including Examples of Calculating Hamming Distances for Neural Network and Data Center Applications" filed Sep. 9, 2020, pp. all.

(Continued)

*Primary Examiner* — Idriss N Alrobaye
*Assistant Examiner* — Richard B Franklin
(74) *Attorney, Agent, or Firm* — Dorsey & Whitney LLP

(57) ABSTRACT

Examples of systems and method described herein provide for the processing of image codes (e.g., a binary embedding) at a memory controller with various memory devices. Such images codes may generated by various endpoint computing devices, such as Internet of Things (IoT) computing devices, Such devices can generate a Hamming processing request, having an image code of the image, to compare that representation of the image to other images (e.g., in an image dataset) to identify a match or a set of neural network results. Advantageously, examples described herein may be used in neural networks to facilitate the processing of datasets, so as to increase the rate and amount of processing of such datasets. For example, comparisons of image codes can be performed "closer" to the memory devices, e.g., at the memory controller coupled to memory devices.

18 Claims, 8 Drawing Sheets

(56) References Cited

U.S. PATENT DOCUMENTS

| | | | |
|---|---|---|---|
| 5,517,597 | A | 5/1996 | Aparicio et al. |
| 5,870,399 | A | 2/1999 | Smith |
| 9,860,302 | B2 * | 1/2018 | Wittner .................. H04L 67/10 |
| 10,410,111 | B2 | 9/2019 | Husain |
| 10,545,861 | B2 * | 1/2020 | Dreier .................. H04L 67/104 |
| 11,010,431 | B2 * | 5/2021 | Olarig ..................... G06T 1/20 |
| 11,086,912 | B2 | 8/2021 | Gan et al. |
| 11,088,784 | B1 | 8/2021 | Gopalan et al. |
| 11,410,043 | B2 | 8/2022 | Jaiswal et al. |
| 2004/0064715 | A1 | 4/2004 | Kaminaga et al. |
| 2010/0095188 | A1 | 4/2010 | Roethig |
| 2010/0332734 | A1 | 12/2010 | Peng et al. |
| 2011/0194780 | A1 | 8/2011 | Li et al. |
| 2012/0257800 | A1 * | 10/2012 | Zheng .................. G06V 10/52 |
| | | | 382/118 |
| 2014/0105467 | A1 | 4/2014 | Myers et al. |
| 2017/0147608 | A1 | 5/2017 | Zhang |
| 2018/0012110 | A1 | 1/2018 | Souche et al. |
| 2018/0276528 | A1 | 9/2018 | Lin et al. |
| 2019/0095463 | A1 | 3/2019 | Moussaffi |
| 2019/0213448 | A1 | 7/2019 | Peng et al. |
| 2020/0389186 | A1 * | 12/2020 | Kim .................. H03M 13/1134 |
| 2021/0110527 | A1 | 4/2021 | Wheaton et al. |
| 2021/0382937 | A1 | 12/2021 | Jie et al. |
| 2022/0075556 | A1 | 3/2022 | Hulton et al. |
| 2022/0076073 | A1 | 3/2022 | Hulton et al. |

FOREIGN PATENT DOCUMENTS

| | | |
|---|---|---|
| WO | 2022055826 | 3/2022 |
| WO | 2022055828 | 3/2022 |
| WO | 2022055829 | 3/2022 |

OTHER PUBLICATIONS

U.S. Appl. No. 17/016,074 titled "A Memory Including Examples of Calculating Hamming Distances for Neural Network and Data Center Applications" filed Sep. 9, 2020, pp. all.

ISR/WO dated Dec. 21, 2021 for PCT Appl. No. PCT/US2021/049139; pp. all.

PCT Application No. PCT/US2021/049139 titled "Memory Controllers Including Examples of Calculating Hamming Distances for Neural Network and Data Center Applications" filed Sep. 3, 2021, pp. all pages of application as filed.

PCT Application No. PCT/US2021/049146 titled "A Memory Including Examples of Calculating Hamming Distances for Neural Network and Data Center Applications" filed Sep. 3, 2021, pp. all pages of application as filed.

PCT Application No. PCT/US2021/049151 titled "Memory Systems Including Examples of Calculating Hamming Distances for Neural Network and Data Center Applications" filed Sep. 3, 2021, pp. all pages of application as filed.

\* cited by examiner

MEMORY CONTROLLERS INCLUDING EXAMPLES OF CALCULATING HAMMING DISTANCES FOR NEURAL NETWORK AND DATA CENTER APPLICATIONS

BACKGROUND

Neural networks can provide output data which represent "labels" of input data. For example, in a type of neural network, input data is provided to a set of layers in which some portion of the input data is multiplied by a set of weights and accumulated in a transfer function (which may be nonlinear), to provide neural network output data. That output data may be referred to as labels, e.g., in a deep learning neural network environment. Labels may represent one or more aspects or features of the input data.

A deep learning neural network environment may be interconnected among various neural networks, e.g., the output of certain neural networks are provided as input to other neural networks. Often, deep learning neural networks may utilize large datasets, e.g., a facial image deep learning neural network can be trained on 8-million face images (like FaceNet). Large datasets, often being based on memory-intensive content like images or videos, demand increasing amounts of memory and increasing data transfer requirements, like bandwidth or a number of memory connections to a processor, e.g., to retrieve the data of the dataset for training or processing on the deep neural network.

Image content can be represented using a hash algorithm or a hash. For example, a hash can be applied to a particular image to represent that image as a binary embedding. That is a representation of the image is "embedded" into a binary representation or binary code. A particular binary embedding can used as a way to match that image to another image, e.g., the respective binary embedding's of the two images are exactly the same.

From information theory, a Hamming distance may be computed, among two numerals (e.g., a binary number) of equal length, by identifying a number of numeric positions in the numerals that are different (e.g., different bits).

Moreover, there is an increasing interest in moving wireless communications to "fifth generation" (5G) systems. 5G offers promise of increased speed and ubiquity, but methodologies for processing 5G wireless communications have not yet been set. In some implementations of 5G wireless communications, "Internet of Things" (IoT) devices may operate on a narrowband wireless communication standard, which may be referred to as Narrow Band IoT (NB-IoT). For example, Release 13 of the 3GPP specification describes a narrowband wireless communication standard.

DETAILED DESCRIPTION

Figure 1:
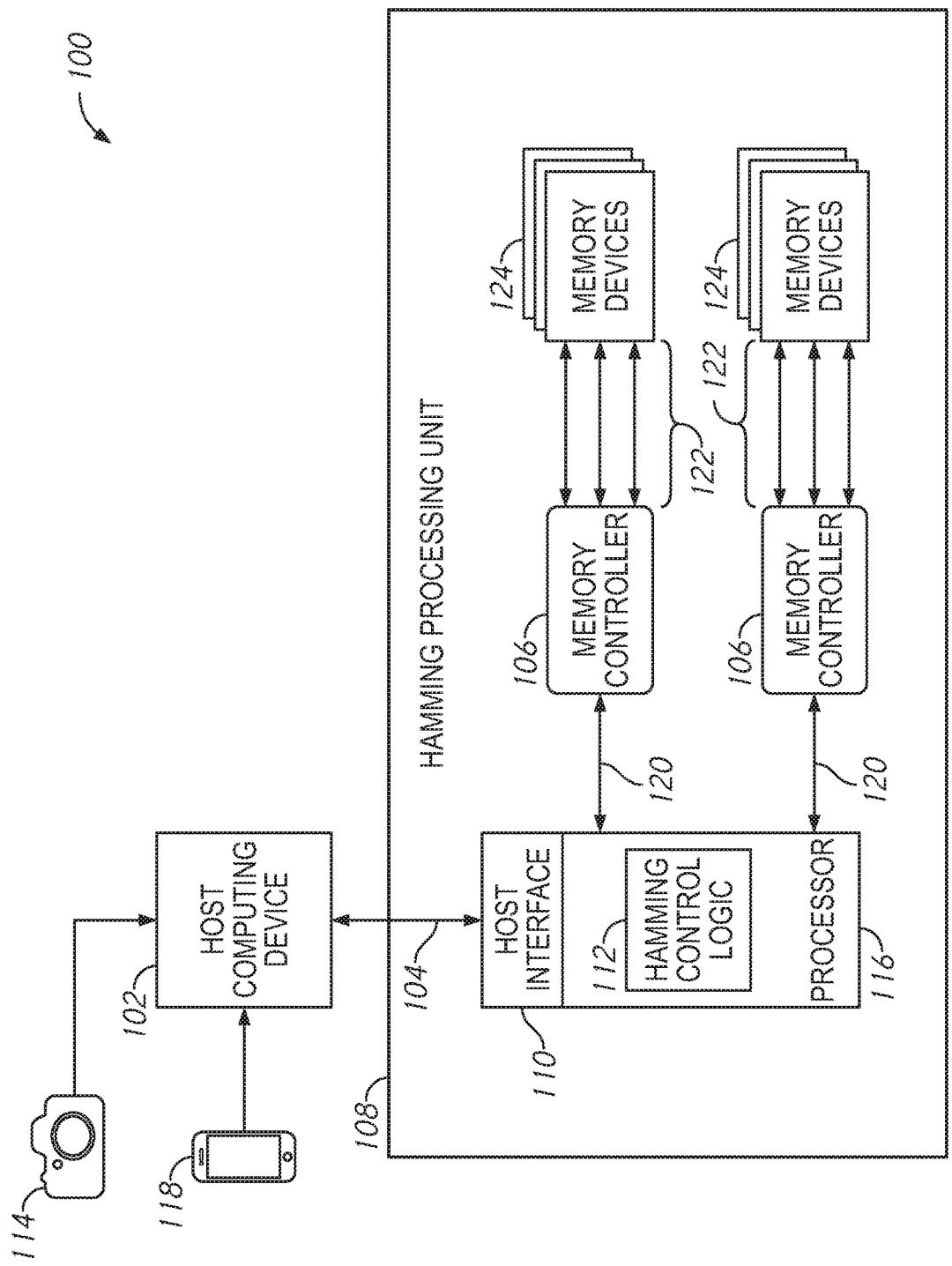
FIG. 1 is a schematic illustration of a system arranged in accordance with examples described herein.

Examples of systems and method described herein provide for the processing of image codes at various memory devices. Hamming image codes may generated by various endpoint computing devices, such as Internet of Things (IoT) computing devices, that receive or obtain images of their surrounding environments. As an example, a smartphone or camera device may obtain an image of a vehicle, like a car or a truck. Such devices can generate a Hamming processing request, having an image code of the image, to compare that representation of the image to other images. In the example, the image of the vehicle may be compared to other vehicle images, e.g., to identify the vehicle. The Hamming processing request may be obtained at the computing device itself (e.g., in the example, the smartphone) or a network of computing devices (e.g., a data center) that can route the Hamming processing request to one or more memory devices for processing of the image code. Accordingly, as part of processing the image code, the memory device can compare the image code to other image codes of respective images that are stored on the memory device. Advantageously, in processing the Hamming processing request at memory devices themselves—in contrast to, for example, a processor requesting and obtaining images at an associated memory (e.g., a cache memory) for comparison—the systems and methods described herein provide for efficient processing of Hamming image codes, with less memory requests being utilized in such systems because the comparison of the images codes are occurring at the memory devices themselves. This may be referred to as "edge" processing of image codes because the processing, including the comparison of image codes, are occurring at a processing unit having memory devices, at a memory controller coupled to memory devices, or at the memory devices themselves.

Continuing the example of obtained image of an obtained vehicle image, an image code is generated based on various features of the obtained vehicle image. In the example, features may include a color of the vehicle, words associated with a model/make of the vehicle (e.g., brand names), aspects of the background of the image, a size of the vehicle in relation to the background image, or other size aspects of the vehicle in relation to other aspects of the vehicle or background. Accordingly, an obtained vehicle image may be represented by various features. The features are used to calculate an image code for that vehicle image. For example, a hash, like a supervised semantics-preserving deep hashing (SSDH) algorithm, may be used to represent the features as a binary embedding. The binary embedding can be referred to as an image code of the obtained image. While the example of an obtained image is with reference to an obtained vehicle image, it can be appreciated that various types of images may be obtained. As another example, images of individuals or faces or individuals such that image codes can be calculated for any type of image, including those of individuals or faces of individuals (e.g., for facial recognition purposes). Calculating image codes based on images of individuals or faces of individuals may be utilized in security applications, such as identifying individuals in a dataset of convicted criminals.

With the image code, a Hamming processing request can be generated to compare the image code of the obtained image to corresponding image codes of images stored on memory devices. For example, a hash can also be applied to the images stored on memory devices, to obtain image codes of the respective images for comparison with the image code of the obtained image. The comparison includes calculating respective Hamming distances of the image code of the obtained image to each respective image code of the respective images stored on the memory devices. Once calculated, a set of results may be obtained (e.g., using a K-nearest-neighbor algorithm) that is indicative of the "shortest" Hamming distances, e.g., for a binary embedding, the lowest values of the Hamming distances. This set of results indicates a set of stored images that share the most features of the obtained image. Accordingly, using that set of results, various features of the obtained image may be identified as corresponding to features obtained in the set of results or at least using the features of one result of the set of results. Additionally or alternatively, if the Hamming distance calculation is null or zero, an "exact" match can be determined in that the obtained image has an image code that matches another image code of a stored image. Accordingly, any information associated with that stored image (e.g., stored fields/parameters) may be inferred as features for the obtained image.

Advantageously, examples of systems and methods described herein may be used in neural networks (e.g., a deep learning neural network) to facilitate the processing of datasets, which may include the use of binary embedding or image codes. Examples herein increase the rate and amount of processing of such datasets in neural network, as comparisons of image codes (e.g., a binary embedding) can be performed "closer" to the memory devices, e.g., at a processing unit having memory devices, at a memory controller coupled to memory devices, or at the memory devices themselves. By closer to the memory device herein is generally meant that fewer interfaces and/or less latency may be provided by systems described herein relative to systems performing Hamming distance calculations in a host computer. For example, when processing at the memory devices themselves, an IoT device may perform "edge" computing in comparing a given image to stored images on the IoT device itself, to determine whether there is a set of results that matches that given image. Memory devices described herein, which may include non-volatile memories, can be utilized to facilitate processing of datasets in neural networks; thereby increasing processing capacity of the calculations performed for the neural networks. Accordingly, the rate and amount of processing of datasets in neural networks is increased, e.g., as compared to a conventional neural network processing system, which may first retrieve images or content from the memory devices to process images or content at a local cache or storage device of an associated host computing device, introducing delays into processing speed and processing rates.

Additionally and advantageously, examples of system and methods described herein may increase the precision or accuracy of neural networks, as a more efficient use of memory (e.g., via the increase of the rate and amount of processing) also may allow larger datasets to be stored on memory devices, thereby increasing the size of training datasets and/or data to be processed/stored on the memory devices. Accordingly, a data center housing various pluralities of memory devices can increase the speed of processing of datasets in neural networks using the examples of systems and methods described herein. For example, a host computing device that includes a user application configured to execute Hamming distance calculations may distribute processing of those calculations in generating Hamming processing requests to be processed by memory controllers coupled to the memory devices or processing units having memory devices. In distributing the Hamming processing requests, the host computing device is not limited to a bus connection to the memory devices (e.g., a PCIe bus) that may have limited bandwidth or be limited to using local memory associated with the host computing device itself (e.g., a local cache memory or local storage device). As described herein, a Hamming processing unit (e.g. processor or memory controller) can process various Hamming distance calculations via several buses (e.g., multiple PCIe buses) that are coupled to the memory devices. For example, in various embodiments, one or more memory controllers and pluralities of memory devices can communicate via the Non-Volatile Memory Express ("NVMe") protocol that facilitates processing of memory access requests to the memory devices.

FIG. 1 is a schematic illustration of a system 100 arranged in accordance with examples described herein. System 100 includes a host computing device 102 coupled to IoT device 114 and IoT device 118. System 100 also includes Hamming processing unit 108 coupled to the host computing device 102 via host bus 104. The Hamming processing unit 108 includes host interface 110 that couples the host bus 104 between the host computing device 102 and Hamming processing unit 108. The host interface 110 is coupled to a processor 116 including Hamming control logic 112. The processor 116 is coupled to memory controllers 106 via a respective controller bus 120. Memory controllers 106 provide memory access requests from the processor 116 to memory devices 124 (e.g., as generated by the Hamming control logic 112). The memory devices 124 are coupled to respective memory controllers 106 via respective memory buses 122.

The IoT device 114 can be a camera or include an image capture device, and the IoT device 118 can be implemented using a smartphone or include image capture device. The IoT devices 114 and 118 may capture images and provide images to the host computing device 102. The host computing device 102 may obtain the images from the IoT devices 114 and 118, and further generate image codes based on the obtained images. For example, the host computing device 102 may host a neural network that utilizes image codes, like binary embeddings, to process neural network requests (e.g., requests in a deep learning environment). The host computing device 102 may utilize a hash to generate respective image codes for the obtained images. A binary embedding may be generated using the hash to represent an obtained image from IoT device 114 or IoT device 118. Each bit of the binary embedding may represent an aspect, a feature, or a dimension of the image, such that multiple dimensions may be categorized as a binary value in the binary embedding. Accordingly, an image may be represented as a binary embedding, and images that share one or more bits of the same corresponding value can be said to "match" that image. For example, a 128-byte binary embedding includes 1,024 bits (i.e., 8 bits in a byte multiplied by 128). Each bit of the 1,024 may represent an aspect of an image. Another image that shares a majority or most of the same bits as the 1,024 bits may match that binary embedding, thereby terming that compared image having that at least a portion of the same image code as a match. Accordingly, there is a need for systems and methods to facilitate such matching in an efficient and fast manner. Advantageously, the systems and methods described herein, such as the Hamming processing unit 108, distribute the calculations and comparisons efficiently so that match images of a dataset can be identified faster than a conventional system which may rely on a local cache at host computing device 102 to store and compare such images of a dataset.

One or more neural networks hosted on the host computing device 102 (e.g., as part of a deep learning neural network environment) may process large datasets to obtain neural network results about the datasets. For example, a neural network on the host computing device 102 may obtain an image from the IoT device 114, e.g., to identify a vehicle in the image as compared to other images in a large dataset of vehicle images. To perform such a neural network identification, the neural network on the host computing device 102 generates a Hamming processing request to the Hamming processing unit 108, to obtain image processing results about the obtained image using Hamming distance calculations. For example, the host computing device 102 may include a host processor configured to execute a user application utilizing Hamming distance calculations to obtain image processing results about the obtained image. When executed, the user application generates a Hamming processing request to perform Hamming distance calculations on the obtained image with a dataset (e.g., a vehicle image dataset), to obtain the image processing results about the obtained image. The image processing results may be a set of results obtained from the Hamming processing unit 108. Continuing in the example, the set of results may include or be indicative of certain vehicle images in a dataset of vehicle images, with those vehicle images sharing at least one feature of the obtained image or a match of the vehicle in the obtained image, e.g., based on a comparison of image codes, as described herein.

The memory devices 124 are configured to store data including datasets, such as image or content datasets. For example, a dataset may be stored on the memory devices 124 if the Hamming processing unit 108 obtains, over the host bus 104, the dataset from one or more associated computing devices. In the example, the one or more associated computing devices may be computing devices in a data center or a personal computing device coupled, via a network connection, to the Hamming processing unit 108. The Hamming processing unit 108 is configured to the store the dataset (e.g., images) among the memory devices 124. For example, the Hamming processing unit 108 may store discrete units of the dataset (e.g., images or video frames) in the memory devices 124. In the examples described herein, the memory devices 124 may be non-volatile memory devices, like a NAND memory device. The memory devices 124 may also include or more types of memory, including but not limited to: DRAM, SRAM, triple-level cell (TLC) NAND, single-level cell (SLC) NAND, SSD, or 3D XPoint memory devices. Data stored or data to be accessed on the memory devices 124 is communicated via the memory buses 122 from a respective memory controller 106. For example, the memory buses 122 may be PCIe buses that operate in accordance with an NVMe protocol.

To obtain the set of results (e.g., a set of images of a dataset) from the memory devices 124 in the Hamming processing unit 108, the host processor on the host computing device may also be configured to generate the Hamming processing request and provide the Hamming processing request via the host bus 104 to the Hamming processing unit 108 received at the host interface 110 of the Hamming processing unit 108. For example, the host bus 104 may be a PCIe bus that can communicate processing requests between the host computing device 102 and the Hamming processing unit 108. The host interface 110 is configured to receive Hamming processing requests from the host computing device 102; for example, the host interface 110 may include a port configured to receive the Hamming processing request when detected on the host bus 104. The host interface 110 is further configured to provide the Hamming processing request to the processor 116 includes Hamming control logic 112 configured to receive the Hamming processing request and to calculate a plurality of Hamming distances among a dataset and the obtained image.

The Hamming processing request may include the image code associated with the obtained image, e.g., as hashed by the host computing device 102. To perform the comparison of the image code of the obtained image to images in a dataset (e.g., a vehicle image dataset), the Hamming control logic 112 may include control instructions that, when executed by the processor 116, generate and provide memory access requests to the memory devices 124. Accordingly, the processor 116 including the Hamming control logic 112, responsive to the Hamming processing request, generates one or more memory access requests (e.g., a read command) for the memory devices 124 to access information associated with images in the dataset. For example, the information accessed may be the images themselves which are read from the memory devices 124, or the information accessed may be image codes representative of images in a dataset. In the example, when the images themselves are accessed, the processor 116 may hash the images with the same hash that the host computing device 102 applied to the obtained image from the IoT device 114 or IoT device 118. While described in the examples herein as a read command, a memory access request may be various types of memory access requests. For example, in embodiments with multiple memory planes on a memory die, a memory access request may include a multi-plane read command, to read multiple planes on that memory die. As another example, in embodiments with multiple logical units (LUNs) of a memory device 124, a memory access request can include a concurrent LUN read command.

In example implementations, the processor 116 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide Hamming distance calculations as part of the Hamming processing unit 108.

Once the information is accessed from the memory devices 124, the Hamming control logic 112 may be configured to control the processor 116 to compare image codes of the dataset to the image code that was provided as part of the Hamming process request. To compare the image codes of the dataset to the image code that was provided as part of the Hamming processing request, the Hamming control logic 112 is further configured to provide the processor 116 with control instructions to calculate a respective Hamming distance for each image code of the dataset and the image code that was provided as part of the Hamming process request. In an implementation where the image codes are binary embeddings or representations, a Hamming distance may be calculated for each image code of the dataset and the image code of the obtained image as provided in Equation (1):

$$d(p,q) = \Sigma_{i=1}^{n}(q_i + p_i) \bmod 2 \qquad (1)$$

where p is a bit of a binary image code as provided in the Hamming process request, q is a bit of a respective image code of an image in the dataset, and n is the number of bits in the respective image codes. As indicated, a "mod 2" operation, being a modulo-2 calculation, is performed after the summation of the bits. The results from each modulo-2 operation are summed to provide the Hamming distance for a particular image code representing an image of the dataset and the image code that was provided as part of the Hamming processing request (e.g., an image code of the obtained image from the IoT device 114 or IoT device 118).

In calculating a plurality of Hamming distances, the image code provided as part of the Hamming process request is compared to each image code representative of a corresponding image of an image dataset. Each Hamming distance calculation is representative of the obtained image from the IoT device 114 or IoT device 118 being compared to an image of dataset. To determine a match of the obtained image, a set of results may be obtained by the processor 116 by executing a results algorithm to include matches in the set of results, as controlled by the Hamming control logic 112. For example, the Hamming control logic 112 may be configured to apply a results algorithm, as executed by the processor 116, as a threshold comparison, such that any Hamming distance calculation passing a threshold is included in a set of results. As another example, a results algorithm may be executed by the processor 116 as a null-test, such that only a null result for a Hamming distance calculation is included in a set of results, which set may be unitary. As yet another example, a results algorithm may be executed by the processor 116 as a k-nearest neighbor algorithm ("k-nn" algorithm), such that a number of neighbors in a bitwise dimensional space are selected as "nearest" to the image code of the obtained image based on the calculated Hamming distance calculation of that respective image code representative of an image of the dataset. In the example, the image code of the obtained image is defined as the "k" for k-nn algorithm; and each image code representative of a corresponding image of an image dataset is classified according to different labels (e.g., a label may be image codes that have a Hamming distance of two bits to the image code of the obtained image). Continuing in the example, the set of results comprises the most frequent label(s) to the image code of the obtained image.

As additional or alternative example implementations of such results algorithms, a results algorithm may be executed by the processor 116 as a null-test, such that only a null result for a Hamming distance calculation is included in a set of results, which set may be unitary. A results algorithm may additionally or alternatively utilize a set of criteria for a match, such as a specified tolerance of matches, a match with minimum error (e.g., as compared to other matches), or any error criteria. For example, a threshold results algorithm may use an error upper-bound to identify matches, such that matches are defined as those with errors that are under the error-upper bound. Accordingly, any number or results algorithms may be applied to the Hamming distance calculations to identify a set of results indicative of certain images in the dataset that match the obtained image.

While examples of images codes being calculated in accordance with a Hamming distance of hashed binary embedding have been described to identity a matched image code of an obtained image, it can be appreciated that alternative hashing techniques may be utilized to calculate image codes, such as perceptual hashing or feature hashing to calculate image codes. Such hashing may utilize k-nn as a results algorithm or alternative algorithms to compare results of calculated image codes. As an example of an alternative hashing technique, a Bloom filter may be utilized to hash an obtained image and calculate image codes for a dataset. In the example, different than applying a modulo-2 calculation as described with respect to Hamming calculations herein, images codes may be summed together, e.g., via an AND-operation to acquire sets of hashed image codes in varying distributions. Using the summed sets of hashed image codes a control logic, like the Hamming control logic 112 described herein, may identify which image codes share a same set (e.g., a set of results) thereby indicating a match of the image code representative of the obtained image.

Once identified as the set of results, the Hamming control logic 112 is configured to control the processor 116 to provide the set of results to host computing device 102 via the host bus 104. For example, the set of results may be provided to the host computing device 102, in accordance with control instructions of the Hamming control logic 112, as the corresponding images of the dataset included in the set of results, which may be referred to as image processing results. Accordingly, the host computing device 102 may utilize the provided set of results in a neural network hosted by the host computing device 102.

To perform the Hamming distance calculations, system 100 utilizes the Hamming processing unit 108, including its Hamming control logic 112 and memory controllers 106, to distribute processing of the memory access requests to the memory devices 124. The Hamming control logic 112 is configured to generate one or more memory access requests, which are provided to the memory devices 124 via the memory controllers 106 and respective memory buses 122. The Hamming control logic 112 provides the memory access requests to memory controllers 106 via respective controller buses 120. Responsive to obtaining the memory access requests from the Hamming control logic 112, the memory controllers 106 provide respective memory access requests, to multiple memory devices 124. A memory controller 106 may utilize information in the memory access request to identify which memory device 124 a memory access request is to be provided. For example, a memory controller 106 may utilize a memory address, provided in the memory access request (e.g. as header information), and a corresponding table of memory addresses to identify a relevant memory device 124 for that memory access request. As another example, a memory controller 106 may utilize a memory device identification, whether logical or physical, provided in the memory access request to identify a relevant memory device 124 for that memory access request. Upon identifying a memory device 124 to provide the memory access request based on information in the memory access request, the memory controller issues the one or more memory access requests (e.g., a read command) to respective memory devices 124 to access information associated with images in the dataset (e.g., image codes or images themselves).

In utilizing the respective controller buses 120 and memory buses 122, the Hamming processing unit 108 may utilize multiple buses to access information associated with images of a dataset, whether image codes or images themselves, faster than a conventional system which may obtain information about the dataset over a single host bus 104 for processing at the host computing device 102. Accordingly, the system 100, advantageously, may increase the rate and amount of processing of such datasets in a neural network hosted on host computing device 102, as comparisons of image codes are performed "closer" to the memory devices 124, e.g., at the Hamming processing unit 108 having the memory devices 124 via controller buses 120 and respective memory buses 122.

In various implementations, the memory controllers 106 may be NVMe memory controllers 106, which are coupled to the processor 116 via a respective PCIe bus operating in accordance with an NVMe protocol. The controller bus 120 may be an NVMe bus when operating in accordance with an NVMe protocol. In such implementations, the memory devices 124 may be NAND memory devices, which are coupled to the NVMe memory controllers 106 via a respective PCIe bus operating in accordance with an NVMe protocol. Accordingly, the memory buses 120 may be referred to as NVMe memory buses. Accordingly, in comparison to a conventional memory system which may access memory via a single host bus to host computing device 102, the system 100, advantageously, may increase the rate and amount of processing by the number of NVMe memory buses 120 connected to respective memory devices 124. Accordingly, in embodiments where the processor 116 is a FPGA, the system 100 may be referred to as "accelerating" Hamming distance calculations with an increase availability of data transfer over the memory buses 122.

Figure 2:
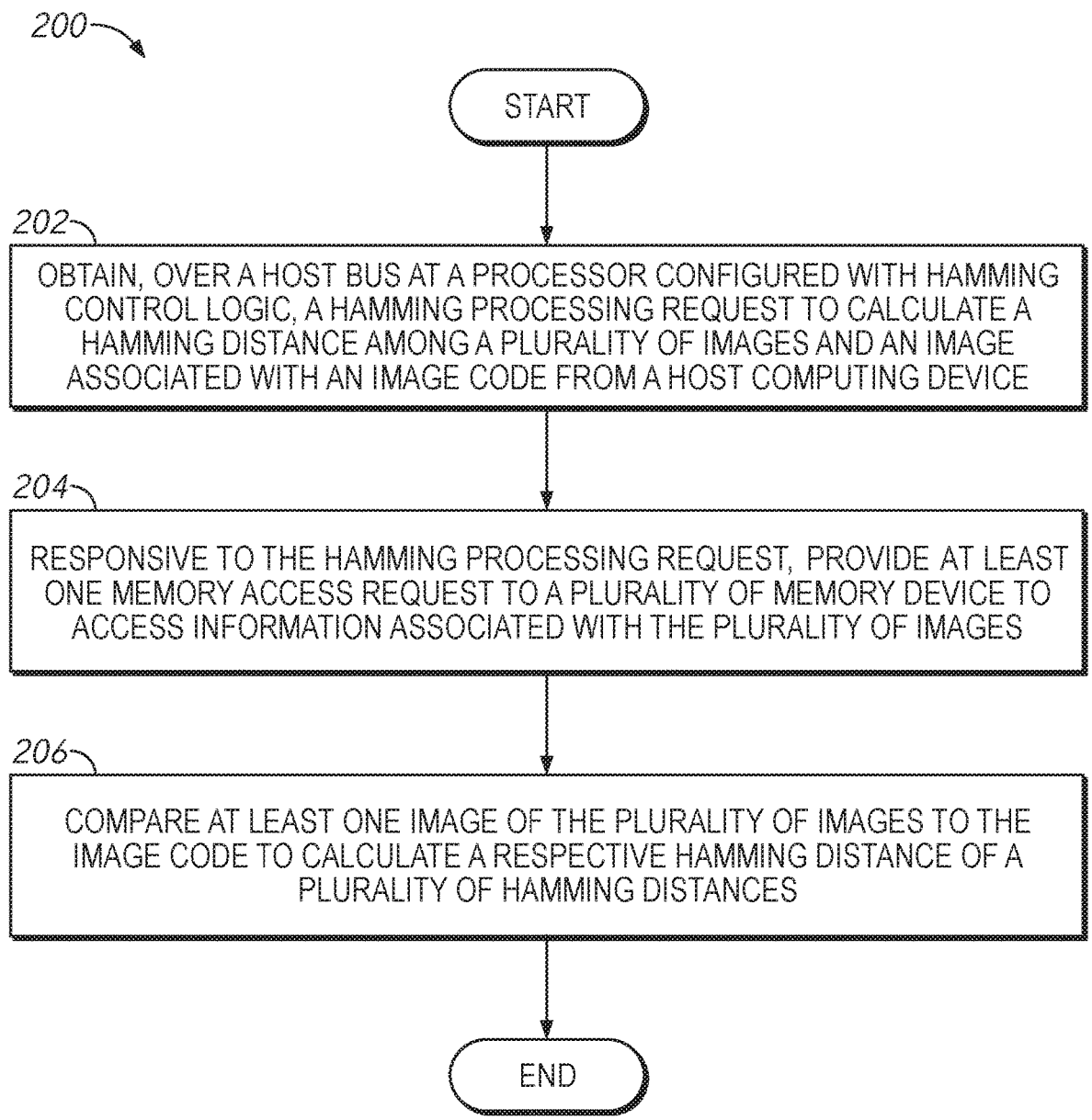
FIG. 2 is a schematic illustration of a method in accordance with examples described herein.

FIG. 2 is a schematic illustration of a method 200 in accordance with examples described herein. Example method 200 may be performed using, for example, a Hamming processing unit 108 that executes executable instructions (e.g., execution by Hamming control logic 112 at the processor 116) to interact with the memory devices 124 via controller buses 120 and respective memory buses 122. For example, the operations described in blocks 202-206 may be stored as computer-executable instructions in a computer-readable medium accessible by processor 116. In an implementation, the computer-readable medium accessible by the processor 116 may be one of the memory devices 124. For example, the executable instructions may be stored on one of the memory devices 124 and retrieved by a memory controller 106 for the Hamming processing unit 108 to execute the executable instructions for performing the method 200. Additionally or alternatively, the executable instructions may be stored on a memory coupled to the host computing device 102 and retrieved by the processor 116 to execute the executable instructions for performing the method 300.

Example method 200 may begin with block 202 that start execution of the method and includes an operation to obtain, over a host bus at a processor configured with Hamming control logic, a Hamming processing request to calculate a Hamming distance among a plurality of images and an image associated with an image code from a host computing device. In the example implementation of the Hamming processing unit 108, a Hamming processing request is obtained via host bus 104, e.g., from a host computing device 102. For example, the host bus 104 may be a PCIe bus that couples the Hamming processing unit 108 to the host computing device 102, such that the host computing device 102 may provide information to the Hamming processing unit 108 from a user application, executing on a host processor, which utilizes Hamming distance calculations and generates the Hamming processing requests. For example, the Hamming processing request, as generated by the user application, may specify that Hamming distance calculations regarding an image code of an image and a dataset, including a plurality of images, stored on the memory devices 124 are to be performed; and, accordingly, requests, by virtue of the Hamming process request, that the Hamming control logic 112 implement such calculations at the Hamming processing unit 108. In the example, the Hamming process request may include the image code associated with the image. The image may be an image obtained from an image capture device, e.g., IoT device 114 or IoT device 118. Accordingly, in various implementations, at block 202, the Hamming control logic 112 obtains the Hamming process request.

Block 202 may be followed by block 204, such that the method further includes an operation, responsive to the Hamming processing request, to provide at least one memory access request to a plurality of memory devices to access information associated with the plurality of images. In the example implementation of the Hamming processing unit 108, the Hamming control logic 112 executes an executable instruction to provide memory access requests to the memory devices 124. For example, responsive to the Hamming processing request, the Hamming control logic 112 generates one or more memory access requests (e.g., a read command) for the memory devices 124 to access information associated with images in a dataset having the plurality of images. For example, the information to be accessed may be the images themselves stored on the memory devices 124, or the information accessed may be image codes representative of images in a dataset. In providing the memory access requests, the Hamming control logic 112 may include information in the at least one memory access requests for a memory controller (e.g., memory controller 106) to identify which memory devices 124 the at least one memory access requests are to be provided. For example, the Hamming control logic 112 may include in (e.g., as header info) each at least one memory access request a memory address of an image or image code associated with an image of the plurality of images, and/or a memory device identification for the image or the image code associated with the image.

Block 204 may be followed by block 206, such that the method further includes an operation to compare at least one image of the plurality of images to the image code to calculate a respective Hamming distance of a plurality of Hamming distances. In the example implementation of the Hamming processing unit 108, the Hamming control logic 112 executes an executable instruction to compare at least one image of the plurality of images to the image code to calculate a respective Hamming distance. For example, the Hamming control logic 112 may execute executable instructions at the processor 116 to calculate respective Hamming distances for each image code of the dataset and the image code of the obtained image in accordance with Equation (1). Accordingly, each Hamming distance calculation is representative of the image code being compared to one of the plurality of images (e.g., respective images of a dataset). The method 200 ends after execution of the block 206.

The blocks included in the described example method 200 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 3:
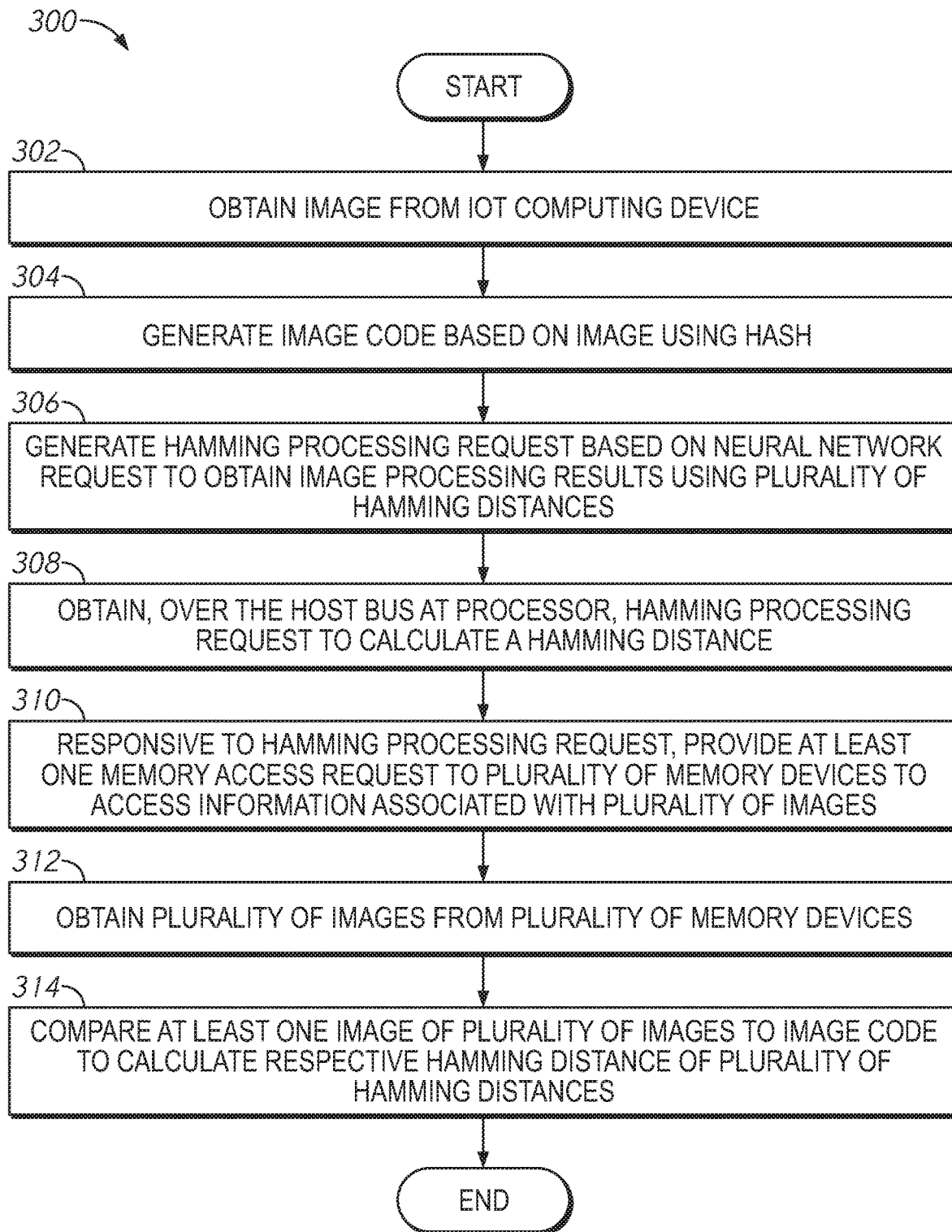
FIG. 3 is a schematic illustration of a method in accordance with examples described herein.

FIG. 3 is a schematic illustration of a method 300 in accordance with examples described herein. Example method 300 may be performed, for example, by a host computing device 102 and/or a Hamming processing unit 108 may execute executable instructions to interact with the memory devices 124 via controller buses 120 and respective memory buses 122. For example, some instructions may be executed by a host processor at host computing device 102 (e.g., blocks 302-306), while other instructions may be executed by Hamming control logic 112 at the processor 116

(e.g., blocks 308-314). The operations described in blocks 302-314 may be stored as computer-executable instructions in one or more computer-readable medium accessible by the host processor and/or by processor 116. For example, the executable instructions may be stored on one of the memory devices 124 and retrieved by a memory controller 106 for the host computing device 102 and/or Hamming processing unit 108 to execute the executable instructions for performing the method 300. Additionally or alternatively, the executable instructions may be stored on a memory coupled to the host computing device 102 and retrieved by the processor 116 to execute the executable instructions for performing the method 300.

Example method 300 may begin with block 302 that starts execution of the method and includes an operation to obtain an image from an IoT computing device. In the example implementation, a host computing device 102 obtains an image from IoT device 114 or IoT device 118. IoT devices may include image capture devices, such as a camera, and may capture images to provide to the host computing device 102. In the example implementation, the host computing device 102 may be configured to execute, on a host processor of host computing device 102, a user application which is configured to obtain images from IoT device 114 or IoT device 118. Accordingly, the host computing device 102 may obtain images as part of executing a user application that requests or utilizes images.

Block 302 may be followed by block 304, such that the method further includes an operation to generate an image code based on the using a hash. In the example implementation, the host computing device 102 generates an image code for the obtained image using a hash. In the example, the hash generates a binary embedding, which may referred to as image code, to represent the obtained image from IoT device 114 or IoT device 118. As but one example, a SSDH algorithm may be used to calculate an image code for the image. The host computing device 102 may be configured to execute, on the host processor of host computing device 102, a user application which is configured to hash images and generate corresponding image codes.

Block 304 may be followed by block 306, such that the method further includes an operation to generate a Hamming process request based on a neural network request to obtain image processing results using a plurality of Hamming distances. In the example implementation, a neural network (or one or more neural networks) on the host computing device 102 requests image processing results regarding the obtained image and a dataset (e.g., an image dataset). That neural network request may be generated as part of a deep learning neural network environment, to match the obtained image to images in a dataset, or at least an image in the dataset that shares one or more features/labels/aspects as the obtained image. The neural network request may include a request for image processing results about the image and the dataset, thereby generating a Hamming process request to calculate Hamming distances with respect to where the images of the dataset are stored (e.g., the memory devices 124). The Hamming process request includes the image code, such that the Hamming distances are calculated on the dataset with respect to that image code. The Hamming processing request may be provided by the host computing device 102 to a memory system, memory controller, or memory device, which may be configured to execute that Hamming processing request, e.g., to interact with memory devices 124 where the dataset is stored. In the example implementation, the user application on the host computing device 102 is configured to generate the Hamming processing request and provide it to the Hamming processing unit 108 for calculation of the plurality of Hamming distances with respect to the image code.

Block 308 may be followed by block 306, such that the method further includes an operation to obtain, over the host bus at a processor, a Hamming processing request to calculate a Hamming distance. In the example implementation, a Hamming control logic 112 at the processor 116, obtains, over the host bus 104, the Hamming processing request to calculate one or more Hamming distances with respect to the image code provided as part of the Hamming processing request. In the example implementation, block 308 may be executed analogously as block 202 of method 200. Accordingly, in various implementations, at block 308, the Hamming control logic 112 obtains the Hamming process request.

Block 310 may be followed by block 308, such that the method further includes an operation, responsive to the Hamming processing request, to provide, at least one memory access request to a plurality of memory devices to access information associated with the plurality of images. In the example implementation, a Hamming control logic 112 at the processor 116 executes the instruction to provide memory access requests to the memory devices 124. In the example implementation, block 310 may be executed analogously as block 204 of method 200. Accordingly, as described above, responsive to the Hamming processing request, the Hamming control logic 112 generates one or more memory access requests (e.g., a read command) for the memory devices 124 to access information associated with images in a dataset having the plurality of images.

Block 310 may be followed by block 312, such that the method further includes an operation to obtain the plurality of images from the plurality of memory devices. In the example implementation, a Hamming control logic 112 at the processor 116, obtains the plurality of images at a local cache or a local memory associated with the processor 116 for processing of the plurality of images, e.g., to calculate Hamming distances, thereby comparing the image code with each image of the plurality of images. For example, the local memory or local cache associated with the processor 116 may be a static memory of the Hamming processing unit 108, such as a SRAM or a DRAM. In the example implementation of obtaining the plurality of images, the memory devices 124 may store only the images of dataset, and not corresponding image codes. Accordingly, the plurality of images are obtained at local cache or memory, which is instructed by the Hamming control logic 112, to hash the plurality of images with the same hash that was applied to the obtained image of the IoT device 114 or IoT device 118 to generate the image code associated with that image. Thus, the Hamming control logic 112 obtains the plurality of images from the memory devices 124 and may also hash the plurality of images to generate respective image codes for each image of the plurality of images.

Block 310 may be followed by block 314, such that the method further includes an operation to compare at least one image of the plurality of images to the image code to calculate respective Hamming distances of a plurality of Hamming distances. In the example implementation, block 314 may be executed analogously as block 206 of method 200. For example, the Hamming control logic 112 may execute instructions at the processor 116 to calculate respective Hamming distances for each image code of the dataset and the image code of the obtained image in accordance with Equation (1). The method 300 may end after completion of the block 314.

The blocks included in the described example method 300 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 4:
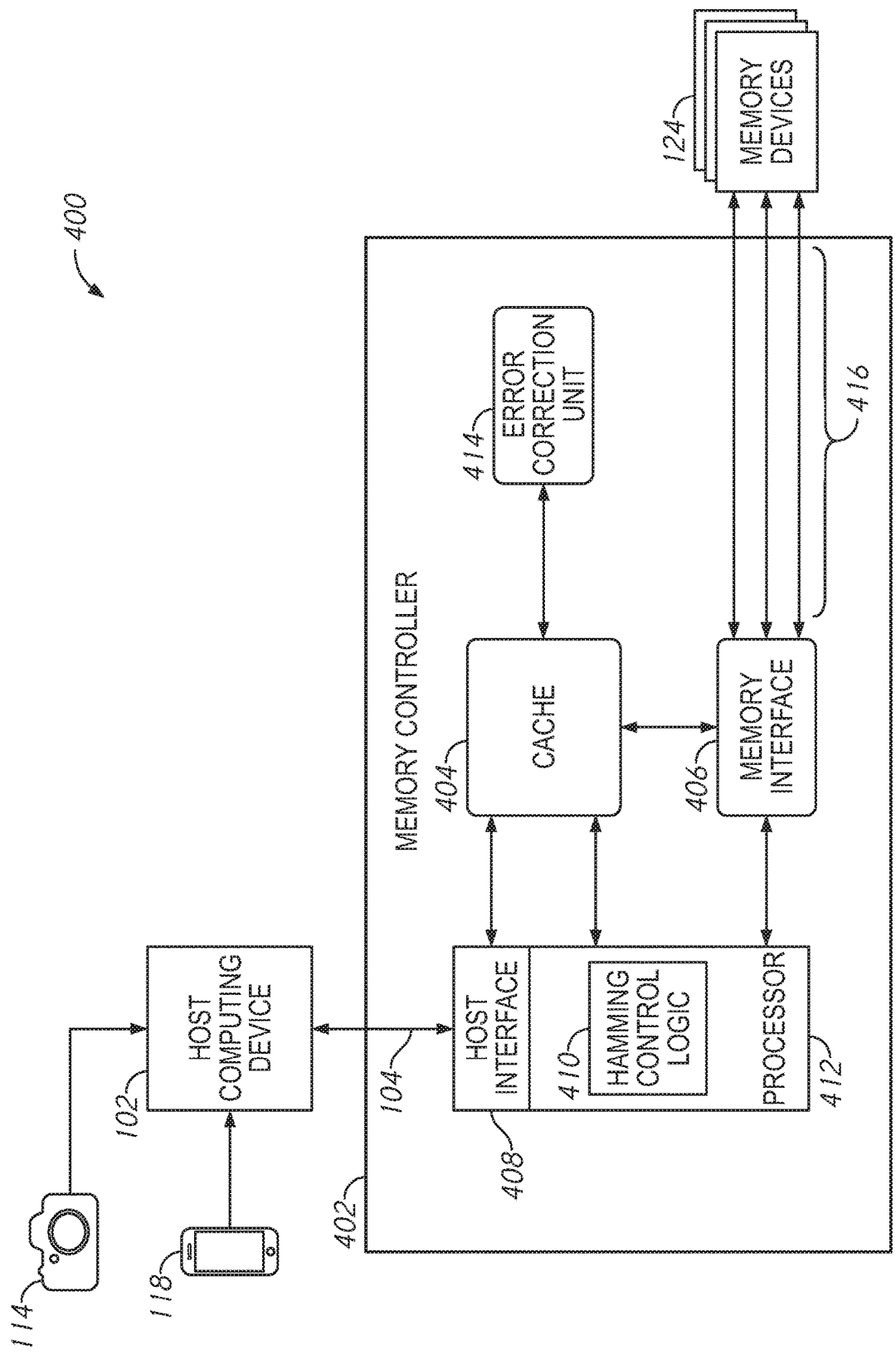
FIG. 4 is a schematic illustration of a system arranged in accordance with examples described herein.

FIG. 4 is a schematic illustration of a system 400 arranged in accordance with examples described herein. System 400 includes a host computing device 102 coupled to IoT device 114 and IoT device 118. System 100 also includes memory controller 402 coupled to the host computing device 102 via host bus 104. The memory controller 402 includes host interface 408 that couples the host bus 104 between the host computing device 102 and the host computing device 102. The host interface 408 is coupled to a processor 412 including Hamming control logic 410. The host interface 408 and the processor 412 may also be coupled to the cache 404 via internal memory controller buses, for example. The processor 412 is coupled to memory devices 124 via memory interface 406 and respective memory buses 416. The memory interface 406 is also coupled to the cache 404, e.g., also via an internal memory controller bus. The cache 404 is coupled to an error correction unit 414 that is configured to perform error correction on data communicated from the cache 404. Additionally or alternatively, it can be appreciated that the same numbered elements of system 100 and system 400 may be configured in an analogous way, such as host computing device 102, host bus 104, IoT device 114, IoT device 118, and memory devices 124. For example, as previously described, the host bus 104 may be a PCIe bus that can communicate Hamming processing requests between the host computing device 102 and, instead of the Hamming processing unit 108 of FIG. 1, the memory controller 402 of FIG. 4. As another example, the memory devices 124 are configured to store data including datasets, e.g., datasets that the memory controller 402 obtains, over the host bus 104, from one or more associated computing devices. And, as indicated with the same numbered element in FIG. 4, the memory devices 124 may include one or more types of memory, including but not limited to: DRAM, SRAM, TLC NAND, SLC NAND, SSD, or 3D XPoint memory devices.

Similar as described with respect to FIG. 1, the host computing device 102 may host a neural network that utilizes image codes, like binary embeddings, to process neural network requests (e.g., requests in a deep learning environment). Further, the host computing device 102 may utilize a hash to generate respective image codes for the obtained images. Advantageously, in using the memory devices 124 and the respective memory buses 416, the memory controller 402 distributes calculations for the respective images codes and their comparisons efficiently so that matched images of a dataset (e.g., a match to an image code of an obtained image) can be identified faster than a conventional system, which may rely on a local cache at host computing device 102 to store and compare such images of a dataset.

Continuing in an example of an obtained image from the IoT device 114, the neural network on the host computing device 102 generates a Hamming processing request to the memory controller 402, to obtain image processing results about the obtained image using Hamming distance calculations. The host computing device 102 may include a host processor configured to execute a user application utilizing Hamming distance calculations to obtain image processing results about the obtained image. When executed, the user application generates a Hamming processing request to perform Hamming distance calculations on the obtained image with a dataset (e.g., a vehicle image dataset), to obtain the image processing results about the obtained image. The host computing device 102 provides the Hamming processing request to the host interface 408 via the host bus 104. When obtained by the host interface 408, the host interface 408 is configured to provide the image code associated with the Hamming processing request to the cache 404 for storage of that image code. As described herein, the memory controller 402 utilizes the cache 404 with the stored, obtained image code to calculate Hamming distances and compare them.

Recall that the Hamming processing request includes the image code associated with the obtained image, e.g., as hashed by the host computing device 102. To perform the comparison of the image code of the obtained image to images in a dataset (e.g., a vehicle image dataset), images stored on memory devices 124 of that dataset also are to be hashed for comparison to the stored image code at cache 404. In some examples, image codes themselves of a dataset may be stored on the memory devices 124, in which case the calculations and comparisons can be performed by the Hamming control logic 410 without hashing. In some implementations, the cache 404 may be coupled directly to a storage device that is part of host computing device 102, like a SRAM or DRAM storage device and obtain the image code to be stored directly from the storage device. For example, the Hamming processing request provided to the host interface 408 may include a memory access command that is provided to the cache to access a storage device on the host computing device 102, to obtain the image code associated with the Hamming processing request. In various implementations, the cache 404 may be a dynamic memory device, like a DRAM, and is configured to interact with the processor 412. For example, the cache 404 may be a data cache that includes (e.g., as a multi-level cache) or corresponds to one or more cache levels of L1, L2, L3, L4, or any other cache level as will be understood by one of skill in the art.

To obtain images codes for calculation and comparison to the stored image code at the cache 404, the Hamming control logic 410 may include control instructions that, when executed by the processor 412, generate and provide memory access requests to the memory devices 124 via the memory interface 406 and memory buses 416. For example, the Hamming control logic 410 may be configured to control the issuance of the one or more memory access requests (e.g., a read command) to respective memory devices 124 to access information associated with images in the dataset (e.g., image codes or images themselves) for the memory controller 402. In the example, the memory controller 402 identifies a memory device 124 to provide the information in the Hamming processing request, and the processor 412 uses that identification information to generate one or more memory access requests. Accordingly, the Hamming control logic 410, responsive to the Hamming processing request and as executed by the processor 412, generates one or more memory access requests (e.g., a read command) for the memory devices 124, coupled to the memory controller 402, to access information associated with images in the dataset. For example, the information accessed may be the images themselves which are read from the memory devices 124, or the information accessed may be image codes representative of images in a dataset. The memory interface 406, interacting with the processor 412 via an internal memory controller bus, is configured to provide the one or more memory access requests to the memory devices 124 via respective memory buses 416. Thus, the memory buses 416 coupling the memory devices 124 to the memory controller 402 provide the stored information (e.g., a dataset of image codes and/or images) for calculation and comparison of Hamming distances to an image code of an obtained image.

In example implementations, the processor 412 may include any type of microprocessor, central processing unit (CPU), an application specific integrated circuits (ASIC), a digital signal processor (DSP) implemented as part of a field-programmable gate array (FPGA), a system-on-chip (SoC), or other hardware to provide Hamming distance calculations as part of the memory controller 402.

Responsive to the one or more memory access requests, the memory devices 124 provide access to the requested information, e.g., information associated with images in the dataset, such as the image codes or the images themselves. With access available at the memory devices 124, the memory interface 406 is further configured to provide the requested information through the memory buses 416 and an internal memory controller bus between the memory interface 406 and the cache 404, whether image codes or images, to the cache 404 for storage. Accordingly, the cache 404 obtains the requested information, whether image codes or images, via the memory devices 124 and their respective memory buses 416.

In the example implementation when the images themselves are accessed, the processor 412 may hash the images with the same hash which the host computing device 102 applied to the obtained image from the IoT device 114 or IoT device 118. Continuing in the example, the memory interface 406 may provide the images themselves to the processor 412 for hashing; and, once hashed, the processor 412 may provide the image codes of the retrieved images back to the cache 404 via an internal memory controller bus. In an example, the internal memory controller bus between the processor 412 and the cache 404 may be an AXI bus.

In some implementations, the cache 404 may be configured to provide the information obtained from the memory devices 124 (e.g., images or image codes) to the error correction unit 414 to error correct that obtained information, and, subsequently, to receive the information from the error correction unit 414 as error-corrected. The error correction unit 414 is configured to error correct data or information obtained from the memory devices 124. For example, the error correction unit 414 may be configured to error correct data in accordance with a desired bit error rate (BER) of operation for the memory devices 124. For example, the error correction unit 414 may include a low-density parity-check correction unit that is configured to error correct data in accordance with a low-density parity-check code. In utilizing the error correction unit 414, the memory controller 402 may correct errors that may occur to data during memory retrieval or storage at memory devices 124. Such implementations may be used depending on whether a desired BER is specified by the host computing device 102 or a user executing a user application at the host computing device 102. In various implementations, as described herein, the error correction unit 414 may not error correct data obtained from the memory devices 124, such as because the data obtained comprises binary embedding as the image codes. Because the host computing device 102 obtains image processing results as a set of neural network results that are indicative of the closest matches a bit difference in some of the set of neural network results may not result in any difference in results, e.g., as to the same set of neural network results that would have been obtained using the error correction unit 414. For example, depending on the length of the image codes used in the Hamming distance comparison, the respective Hamming distance calculations in such systems may not vary significantly so as to obtain a different set of neural network results. Accordingly, the optional implementations using the error correction unit 414 may be utilized when a desired BER of operation for the memory devices 124 is specified.

Once the information from the memory devices 124 is stored in the cache 404, the Hamming control logic 410 may be configured to control the processor 412 to compare image codes of the dataset to the image code that was provided as part of the Hamming process request. To compare the image codes of the dataset to the image code that was provided as part of the Hamming processing request, the Hamming control logic 410 is further configured to provide the processor 412 with control instructions to calculate a respective Hamming distance for each image code of the dataset and the image code that was provided as part of the Hamming process request. For example, the processor 412 may utilize the stored image code at the cache 404 and the respective image codes associated with the information retrieved from the memory devices 124, those respective images codes also being stored at the cache 404, to calculate respective Hamming distances. In an implementation where the image codes are binary embeddings or representations, a Hamming distance may be calculated for each image code of the dataset and the image code of the obtained image as provided in Equation (1), described above. Thereby, in calculating a plurality of Hamming distances, the stored image code of the cache 404, provided as part of the Hamming process request, is compared to each image code representative of a corresponding image of an image dataset.

While examples of images codes being calculated in accordance with a Hamming distance of hashed binary embedding have been described to identity a matched image code of an obtained image, it can be appreciated that alternative hashing techniques may be utilized to calculate image codes, such as perceptual hashing or feature hashing to calculate image codes. Such hashing may utilize k-nn as a results algorithm or alternative algorithms to compare results of calculated image codes. As an example of an alternative hashing technique, a Bloom filter may be utilized to hash an obtained image and calculate image codes for a dataset. In the example, different than applying a modulo-2 calculation as described with respect to Hamming calculations herein, images codes may be summed together, e.g., via an AND-operation to acquire sets of hashed image codes in varying distributions. Using the summed sets of hashed image codes a control logic, like the Hamming control logic 410 described herein, may identify which image codes share a same set (e.g., a set of results) thereby indicating a match of the image code representative of the obtained image.

Similar to the operation of the Hamming control logic 112, the Hamming control logic 410 also may be configured to apply a results algorithm, as executed by the processor 412, to identify a set of results indicative of certain images in the dataset that match the obtained image, e.g., a k-nearest neighbor algorithm, as described herein. As additional or alternative example implementations of such results algorithms, a results algorithm may be executed by the processor 116 as a null-test, such that only a null result for a Hamming distance calculation is included in a set of results, which set may be unitary. A results algorithm may additionally or alternatively utilize a set of criteria for a match, such as a specified tolerance of matches, a match with minimum error (e.g., as compared to other matches), or any error criteria. For example, a threshold results algorithm may use an error upper-bound to identify matches, such that matches are defined as those with errors that are under the error-upper bound. Also similar to the operation of Hamming control logic 112, the Hamming control logic 410 is configured to control the processor 412 to provide the set of results to host computing device 102 via the host bus 104. For example, the set of results may be provided to the host computing device 102, in accordance with control instructions of the Hamming control logic 112, as the corresponding images of the dataset included in the set of results, again referred to as image processing results.

In utilizing the cache 404 and memory buses 416, the memory controller 402 utilizes multiple buses to access information associated with images of a dataset, whether image codes or images themselves, faster than a conventional system which may obtain information about the dataset over a single host bus 104 for processing at the host computing device 102. Accordingly, the system 100, advantageously, increases the rate and amount of processing of such datasets in a neural network hosted on host computing device 102, as comparisons of image codes are performed "closer" to the memory devices 124, e.g., at the memory controller 402 coupled to the memory devices 124 via the memory buses 416.

In various implementations, the memory controllers memory controller 402 may be an NVMe memory controllers, which is coupled to the host computing device 102 via the host bus 104, e.g., a PCIe bus operating in accordance with an NVMe protocol. In such implementations, the memory devices 124 may be NAND memory devices, which are coupled to the NVMe memory controller 402 via a respective PCIe bus operating in accordance with an NVMe protocol. Accordingly, the memory buses 416 may be referred to as NVMe memory buses. Accordingly, in comparison to a conventional memory system which may access memory via a single host bus to host computing device 102, the system 400, advantageously, increases the rate and amount of processing by the number of NVMe memory buses 416 connected to respective memory devices 124. Accordingly, the system 400 may be referred to as "accelerating" Hamming distance calculations with an increase availability of data transfer over the memory buses 416.

Figure 5:
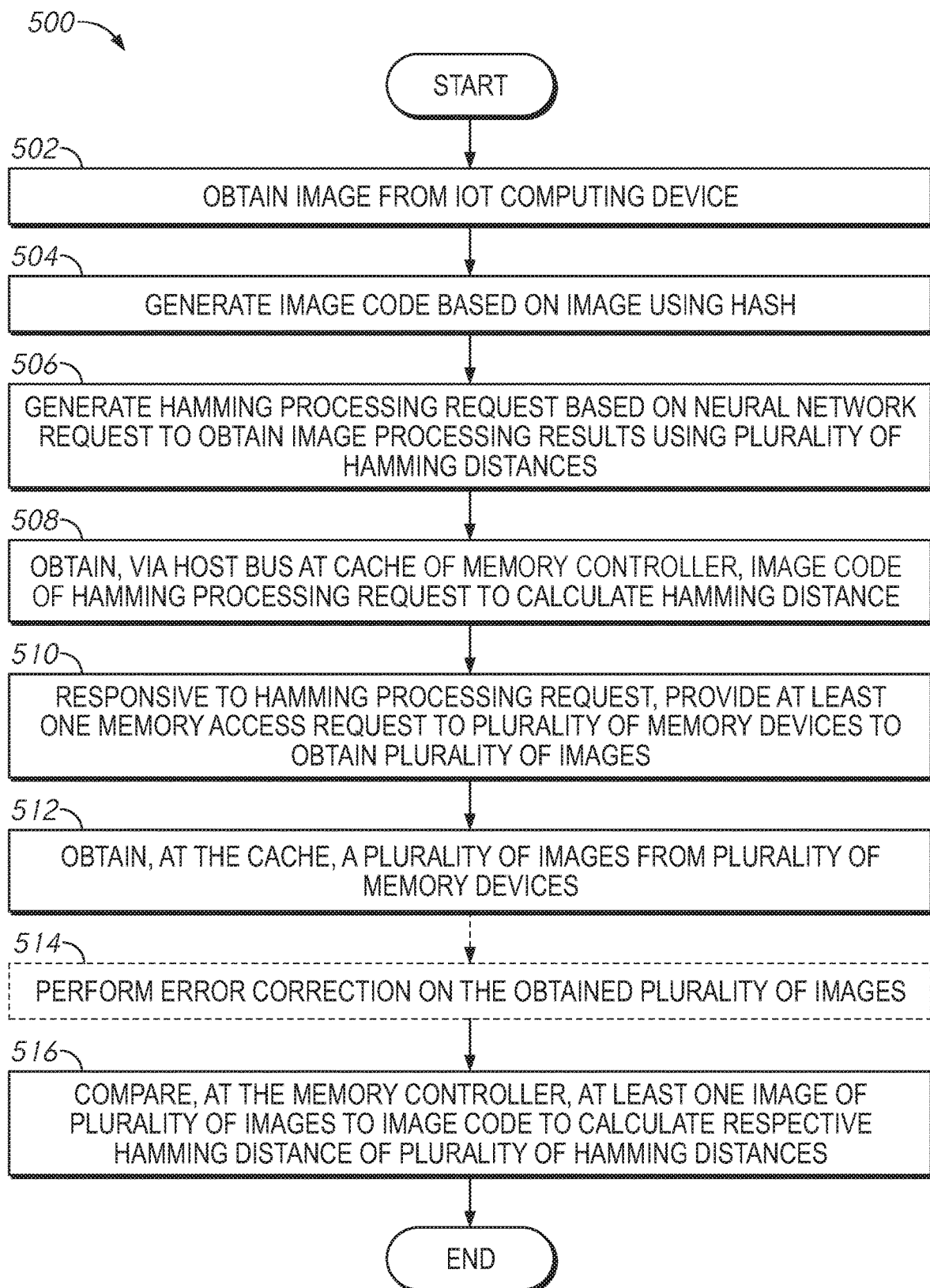
FIG. 5 is a schematic illustration of a method in accordance with examples described herein.

FIG. 5 is a schematic illustration of a method 500 in accordance with examples described herein. Example method 500 may be performed using, for example, a host computing device 102 and/or a memory controller 402 may execute executable instructions to interact with the memory devices 124 via memory buses 416. For example, some instructions may be executed by a host processor at host computing device 102 (e.g., blocks 502-506), while other instructions may be executed by Hamming control logic 410 at the processor 412 (e.g., blocks 508-516). The operations described in blocks 502-516 may be stored as computer-executable instructions in one or more computer-readable medium accessible by the host processor and/or by processor 412. For example, the executable instructions may be stored on one of the memory devices 124 and retrieved by the memory controller 402. In the example, the host computing device 102 and/or itself, the memory controller 402, may execute the executable instructions for performing the method 300. Additionally or alternatively, the executable instructions may be stored on a memory coupled to the host computing device 102 and retrieved by the processor 412 to execute the executable instructions for performing the method 500. The blocks included in the described example method 500 are for illustration purposes. In some embodiments, these blocks may be performed in a different order. In some other embodiments, various blocks may be eliminated. For example, in some implementations, block 514 may be an optional block in executing method 500. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Example method 500 may begin with block 502 that starts execution of the method and includes an instruction to obtain an image from an IoT computing device. Block 502 may be executed in the same way as described with respect to block 302 of method 300. As described, in an example implementation, the host computing device 102 may be configured to execute, on a host processor of host computing device 102, a user application which is configured to obtain images from IoT device 114 or IoT device 118. Accordingly, the host computing device 102 may obtain images as part of executing a user application that requests or utilizes images.

Block 502 may be followed by block 504, such that the method further includes an operation to generate an image code based on the using a hash. Block 504 may be executed in the same way as described with respect to block 304 of method 300. As described, in an example implementation, the host computing device 102 generates an image code for the obtained image using a hash.

Block 504 may be followed by block 506, such that the method further includes an operation to generate a Hamming process request based on a neural network request to obtain image processing results using a plurality of Hamming distances. Block 506 may be executed in the same way as described with respect to block 306 of method 300. As described, in an example implementation, a neural network (or one or more neural networks) on the host computing device 102 requests image processing results regarding the obtained image and a dataset (e.g., an image dataset). Accordingly, the Hamming processing request may be provided by the host computing device 102 to the memory controller 402, which may be configured to execute that Hamming processing request, e.g., to interact with memory devices 124 where the dataset is stored. In the example implementation, the user application on the host computing device 102 is configured to generate the Hamming processing request and provide it to the memory controller 402 for calculation of the plurality of Hamming distances with respect to the image code.

Block 508 may be followed by block 506, such that the method further includes an operation to obtain, via a host bus at a cache of a memory controller, an image code of a Hamming processing request to calculate a Hamming distance. In the example implementation, a Hamming control logic 410 at the processor 412, obtains, over the host bus 104 of the memory controller 402, an image code of the Hamming processing request to calculate one or more Hamming distances. The image code may be provided to a cache 404, by the processor 412 or the host interface 408 via an internal memory controller bus of the memory controller 402, such that the cache 404 obtains the image code for storage. In obtaining the Hamming processing request, the cache 404 may store an image code associated with Hamming processing request at the cache 404. Accordingly, in various implementations, at block 508, the cache 404 obtains the Hamming process request, to store an image code associated with the Hamming processing request.

Block 510 may be followed by block 508, such that the method further includes an operation, responsive to the Hamming processing request, to provide, at least one memory access request to a plurality of memory devices to access information associated with the plurality of images. In the example implementation, block 510 may be executed analogously as block 204 of method 200. In the example, the memory controller 402 identifies a memory device 124 to provide the information in the Hamming processing request, and the processor 412 uses that identification information to generate one or more memory access requests. Accordingly, the Hamming control logic 410, responsive to the Hamming processing request and as executed by the processor 412, generates one or more memory access requests (e.g., a read command) for the memory devices 124, coupled to the memory controller 402, to access information associated with images in the dataset.

Block 510 may be followed by block 512, such that the method further includes an operation to obtain, at the cache, a plurality of images from the plurality of memory devices. In the example implementation, the cache 404 obtains the plurality of images for processing of the plurality of images, e.g., to calculate Hamming distances, thereby comparing the stored image code at the cache 404 with each image of the plurality of images. In the example implementation of obtaining the plurality of images, the memory devices 124 may store only the images of dataset, and not corresponding image codes. Accordingly, the plurality of images are obtained at the cache 404, which is instructed by the Hamming control logic 410, to hash the plurality of images with the same hash that was applied to the obtained image of the IoT device 114 or IoT device 118 to generate the image code associated with that image. Thus, the Hamming control logic 410 obtains the plurality of images from the memory devices 124 and may also hash the plurality of images to generate respective image codes for each image of the plurality of images.

Block 514 may be followed by block 512 such that the method further includes an operation to perform error correction on the obtained plurality of images. In the example, the cache 404 provides the obtained plurality of images (e.g., obtained from the memory devices 124) to the error correction unit 414. The error correction unit 414 error corrects that obtained information, and, subsequently, provides the plurality of images back to the same storage locations in the cache 404 as error-corrected. As described above, block 514 may be an optional step in some implementations of method 500.

Block 516 may be followed by block 512, such that the method further includes an operation to compare, at the memory controller, at least one image of the plurality of images to the image code to calculate respective Hamming distances of a plurality of Hamming distances. In the example implementation, block 516 may be executed analogously as block 206 of method 200. For example, the Hamming control logic 410 may execute executable instructions at the processor 412 to calculate respective Hamming distances for each image code of the dataset obtained at the cache 404 and the image code of the obtained image, also stored at cache 404, in accordance with Equation (1). The method 500 may end after completion of the block 516.

Figure 6:
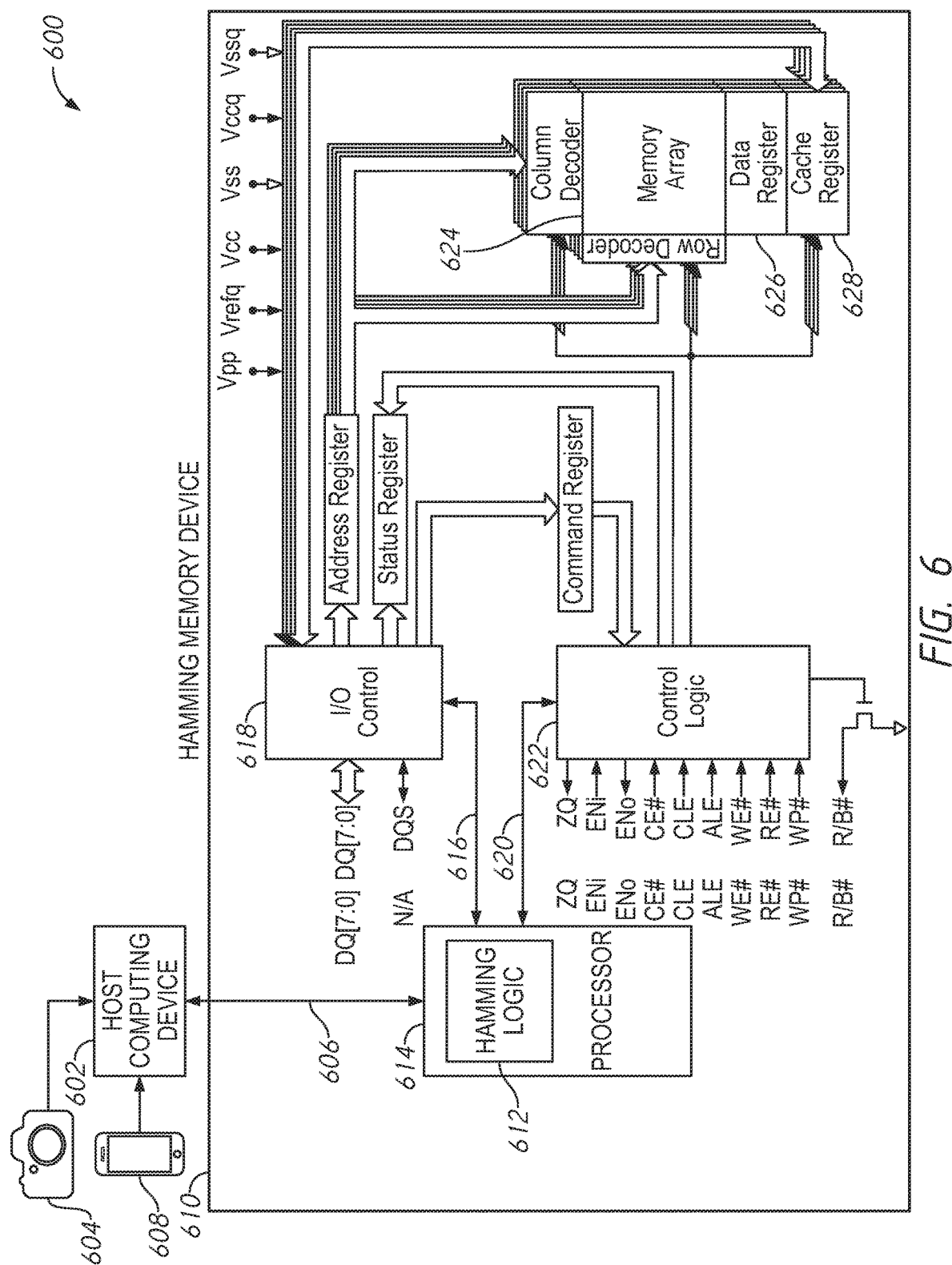
FIG. 6 is a schematic illustration of a memory system arranged in accordance with examples described herein.

FIG. 6 is a schematic illustration of a memory system 600 arranged in accordance with examples described herein. System 600 includes a host computing device 602 coupled to IoT device 604 and IoT device 608. System 600 also includes Hamming memory device 610 coupled to the host computing device 102 via host bus 606. The Hamming memory device 610 includes processor 614, which includes Hamming logic 612, that couples to the host computing device 602 via the host bus 606. Processor 614 is also coupled to input/output (I/O) control unit 618 via I/O bus 616 and coupled to control logic 622 via control bus 620. Control logic 622 interacts with other elements of the Hamming memory device 610, including memory array 624 through the data register 626 and cache register 628. The I/O control unit 618 also interacts with memory array 624, e.g., as certain control pins are enabled at the control logic 622. For example, certain control pins depicted in FIG. 6 (e.g., Eni, CE#, CLE, ALE, WE#, RE#, WP#) may receive control signals that enable operations of the I/O control unit 618 corresponding to that control pin functionality. In various implementations, the Hamming memory device 610 may be a NAND memory device, and the memory array 624 may be a NAND Flash memory array. In addition the numbered elements of Hamming memory device 610, as will be appreciated by one of skill in the art, other features of a memory device (e.g., a NAND memory device) may be included in Hamming memory device 610, such as the various voltages available to elements of the Hamming memory device 610 (e.g., Vpp, Vrefq, Vcc, Vss, Vccq, and/or Vssq). For example, as depicted, an address register may interact with I/O control unit 618 to store and/or provide memory addresses to access at memory array 624 using a row decoder and a column decoder coupled to the memory array 624. Also as depicted, a status register may interact with I/O control unit 618 and control logic 622 to store and/or provide a status of certain memory elements in Hamming memory device 610. And, a command register may interact with I/O control unit 618 and control logic 622 to store and/or provide a command from I/O control unit 618 to control logic 622.

Additionally or alternatively, it can be appreciated that the similarly-named elements of system 100 and system 600 may be configured in an analogous way, such as: host computing device 102 to host computing device 602, host bus 104 to host bus 606, IoT device 114 to IoT device 604, IoT device 118 to IoT device 608, and Hamming control logic 112 to Hamming logic 612. For example, as analogously described with respect to host bus 104, the host bus 606 may be a PCIe bus that can communicate Hamming processing commands between the host computing device 602 and, instead of the Hamming processing unit 108 of FIG. 1, the Hamming memory device 610 of FIG. 6. Accordingly, similar as described with respect to FIG. 1, the host computing device 602 may host a neural network that utilizes image codes, like binary embeddings, to process neural network requests. Further, the host computing device 602 may utilize a hash to generate respective image codes for the obtained images. Advantageously, in processing Hamming processing commands on Hamming memory device 610, a rate and amount of processing of datasets (e.g., an image code dataset) in a neural network of system 600, e.g., as compared to a conventional neural network processing system, which may first retrieve images or content from the memory devices to process images or content at a local cache or storage device of the host computing device 602, introducing delays into processing speed and processing rates.

In an example of an obtained image from the IoT device 604, the neural network on the host computing device 602 generates a Hamming processing command to the Hamming memory device 610, to obtain image processing results about the obtained image using Hamming distance calculations. The generated Hamming processing command includes the hashed image code of the obtained image. As described with respect to the host computing device 102 of FIG. 1, the host computing device 602 may also utilize a hash to generate an image codes for the obtained image (e.g., a binary embedding). Continuing in the example, the host computing device 602 may include a host processor configured to execute a user application utilizing Hamming distance calculations to obtain image processing results about the image code. When executed, the user application generates a Hamming processing command to perform Hamming distance calculations on the hashed image code, to obtain the image processing results about the obtained image. The host computing device 602 provides the Hamming processing command to the processor 614 via the host bus 606. Additionally or alternatively, in various implementations, the host computing device 602 may include a memory controller 402 that provides Hamming processing requests as Hamming processing commands to the Hamming memory device 610 via a memory bus (e.g., a memory bus 416).

Upon obtaining the Hamming processing command at the processor 614, the Hamming logic 612 may identify the Hamming processing command to provide the image code associated with the Hamming processing command to the I/O control unit 618 and to provide one or more control signals indicative of the Hamming processing command to the control logic 622. One or more control signals provided to the Hamming logic 612 can include control signals being provided to control logic pins of the control logic 622 via the control bus 620, such as control logic pins: WE#, CLE, and/or ALE. Accordingly, the control logic 622 may obtain one or more control signals from the Hamming logic 612 based on the Hamming processing command. In an example, obtaining a control signal, at the command latch enable (CLE) pin of the control logic 622, may be indicative to the Hamming memory device 610 that a Hamming processing command has been obtained. Accordingly, the control logic 622 may activate a gate of a transistor that controls a R/B# pin output that indicates a Ready/Busy status of the memory array 624. For example, in obtaining the control signal at the CLE pin, the control logic 622 may provide a gate signal to a transistor such that the drain of the transistor (e.g., if a n-type transistor) sets to high, indicative of a Busy status at the memory array 624. Accordingly, the control logic 622, responsive to obtained one or more control signals indicative of the Hamming process command, may provide internal control signals to control various memory access circuits to perform a memory access operation (e.g., read, write, program). For example, the internal control signals may comprise one or more memory access requests to perform memory access operations. The memory access requests may include memory addresses of cells that are to be accessed in performing the memory access operations.

The various memory access circuits are used during such memory access operations, and may generally include circuits such as row and column decoders, charge pump circuits, signal line drivers, I/O control unit 618, data register 626, and cache register 628. The memory cells in the memory array 624 may be accessed through the use of various signal lines, for example, global word lines (GWLs), local word lines (LWLs), and bitlines (BLs). The memory cells may be non-volatile memory cells, such as NAND or NOR flash cells, phase change memory cells, or may generally be any type of memory cells. The memory cells may be single level cells configured to store data for one bit of data. The memory cells may also be multi-level cells configured to store data for more than one bit of data.

Additionally upon obtaining the Hamming processing command at the processor 614 and, in some implementations, contemporaneously, the Hamming logic 612 may also identify the image code within the Hamming processing command to provide the image code to the I/O control unit 618. For example, the image code may be provided to the DQ pins of the I/O control unit 618 via the I/O bus 616. In the example, the I/O control unit 618 may obtain the image code from the DQ pins when one or more control signals at the control logic 622 are asserted. For example, a combination of control signals may be provided to the control logic 622 such that the I/O control unit 618 obtains the image code to provide the image code to the cache register 628. For example, the control logic 622 may obtain an additional control signal indicative that the image code is to be written to the data register of the memory device, and thus the U/O control unit 618 provides the image code to the cache register 628. In the example, the additional control signal may be obtained at the write enable (WE#) pin of the control logic 622, subsequent to when the one or more controls signals at the control logic 622 are asserted to obtain the image code from the DQ pins. In activating the WE# pin, certain voltages (e.g., Vrefq) may be provided to the cache register 628 to enable writing of image code to the cache register 628 by the I/O control unit 618.

Generally, commands, address information, and write data may be provided to the memory array 624 as sets of sequential I/O transmitted through the various buses coupling the I/O control unit 618 and the memory array 624. A DQS signal (e.g., at a DQS pin) may be used to provide timing information for the transfer of data to the memory array 624 or from the memory array 624. An address register coupled to the I/O control unit 618 may be provided address information by the I/O control circuit I/O control unit 618 to be temporarily stored. The I/O control unit 618 may also be coupled to a status register storing status bits. Status bits stored by the status register may be provided by the I/O control circuit I/O control unit 618 responsive to a read status command provided to the memory array 624, for example. The status bits may have respective values to indicate a status condition of various aspects of the memory array 624 and its operation.

As described, the control logic 622, responsive to obtaining one or more control signals indicative of the Hamming process command, provides one or more memory access requests, including memory addresses of stored images codes (e.g., an image code dataset) at the memory array 624, to various memory access circuits to perform memory access operations. In the example, the Hamming logic 612 generates a plurality of memory addresses to read based on the Hamming processing command. The plurality of memory address are provided to the control logic 622 as data to read, e.g., via a command register as parsed by I/O control unit 618 via I/O bus 616. The control logic 622 generates one or more memory access requests based on the plurality of memory address obtained from the command register.

The Hamming logic 612 may also provide the one or more control signals to the control logic 622 to calculate respective Hamming distances among the image code of the Hamming processing command and each stored image code of a plurality of stored image codes at the memory array 624. In calculating a plurality of Hamming distances, the image code provided as part of the Hamming process command is compared to each image code representative of a corresponding image of an image dataset, for example, or an image code dataset. In an implementation where the image codes are binary embeddings or representations, a Hamming distance may be calculated for each stored image code and the image code of the Hamming processing command as provided in Equation (1), above. For example, each memory access request comprising a memory address of a stored image code is provided to row and column decoders of the Hamming memory device 610 for reading the memory array 624. In the example, each memory address is read to the data register 626 of the Hamming memory device 610 to obtain the plurality of stored image codes on the data register 626.

To calculate each respective Hamming distance, the control logic 622 controls the data register 626 to calculate, at the data register 626, each respective Hamming distance using the image code associated with the Hamming processing command stored at the cache register 628 and the plurality of stored images codes at the data register 626. In the example, at the data register 626, as indicated by Equation (1), a "mod 2" operation, being a modulo-2 calculation, is performed after the adding of the bits of the image code and each respective stored image code. The results from each modulo-2 operation are summed to provide the Hamming distance for a particular stored image code representing an image of an image dataset and the image code that was provided as part of the Hamming processing command. The calculated Hamming distances are stored in the cache register 628. The Hamming logic 612 provides additional control signals to the control logic 622 such that the calculated Hamming distances are provided to the processor 614 via the I/O bus 616 for applying a results algorithm.

To determine a match of the obtained image, a set of results may be obtained by the processor 614 by executing a results algorithm to include matches in the set of results, as controlled by the Hamming logic 612. For example, the Hamming logic 612 may be configured to apply a results algorithm, as executed by the processor 614, as a threshold comparison, such that any Hamming distance calculation passing a threshold is included in a set of results. As another example, a results algorithm may be executed by the processor 614 as a null-test, such that only a null result for a Hamming distance calculation is included in a set of results, which set may be unitary. As yet another example, a results algorithm may be executed by the processor 614 as a k-nearest neighbor algorithm, such that a number of neighbors in a bitwise dimensional space are selected as nearest to the image code of the obtained image based on the calculated Hamming distance calculation of that respective image code representative of an image of the dataset. Accordingly, any number or results algorithms may be applied to the Hamming distance calculations to identify a set of results indicative of certain images in the dataset that match the obtained image.

While examples of images codes being calculated in accordance with a Hamming distance of hashed binary embedding have been described to identity a matched image code of an obtained image, it can be appreciated that alternative hashing techniques may be utilized to calculate image codes, such as perceptual hashing or feature hashing to calculate image codes. Such hashing may utilize k-nn as a results algorithm or alternative algorithms to compare results of calculated image codes. As an example of an alternative hashing technique, a Bloom filter may be utilized to hash an obtained image and calculate image codes for a dataset. In the example, different than applying a modulo-2 calculation as described with respect to Hamming calculations herein, images codes may be summed together, e.g., via an AND-operation to acquire sets of hashed image codes in varying distributions. Using the summed sets of hashed image codes a control logic, like the Hamming control logic 612 described herein, may identify which image codes share a same set (e.g., a set of results) thereby indicating a match of the image code representative of the obtained image.

Once identified as the set of results, the Hamming logic 612 is configured to control the processor 614 to provide the set of results to host computing device 602 via the host bus 606. For example, the set of results may be provided to the host computing device 602, in accordance with control instructions of the Hamming logic 612, as the corresponding stored image codes included in the set of results, which may be referred to as image processing results for the Hamming memory device 610. Accordingly, the host computing device 602 may utilize the provided set of results from the Hamming memory device 610 in a neural network hosted by the host computing device 602.

Figure 7:
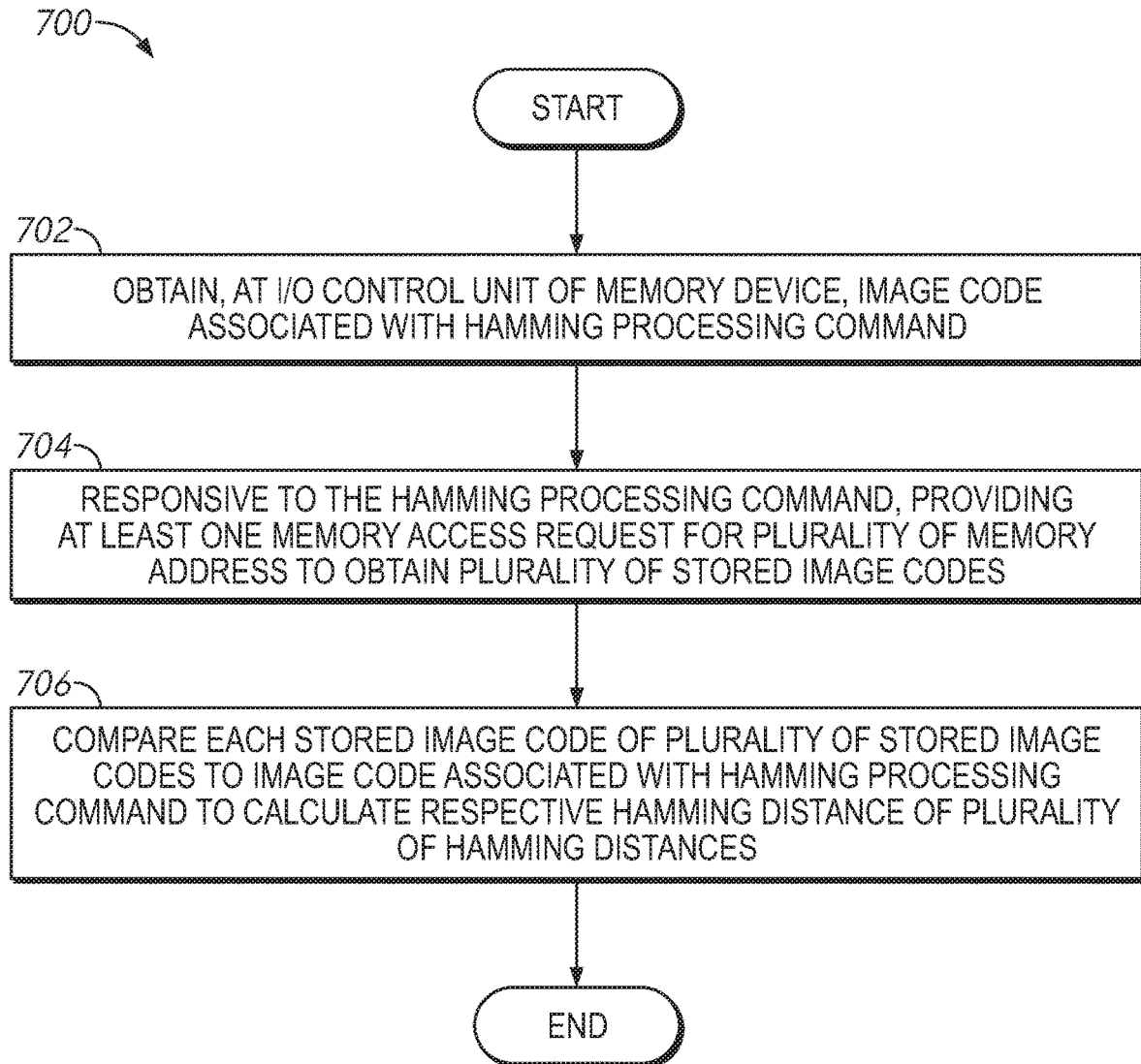
FIG. 7 is a schematic illustration of a method in accordance with examples described herein.

FIG. 7 is a schematic illustration of a method 700 in accordance with examples described herein. Example method 700 may be performed using, for example, a Hamming memory device 610 executes executable instructions (e.g., by Hamming logic 612 at the processor 614) to interact with the memory array 624. For example, the operations described in blocks 602-606 may be stored as computer-executable instructions in a computer-readable medium accessible by processor 614. The operations described in blocks 702-706 may be stored as computer-executable instructions in one or more computer-readable medium accessible by the processor 614. For example, the executable instructions may be stored on a memory coupled to the host 602 and retrieved by the processor 614 execute the executable instructions for performing the method 700.

Example method 700 may begin with block 702 that start execution of the method and includes an operation to obtain, at an I/O control unit of a memory device, an image code associated with a Hamming processing command. In an example implementation of the Hamming memory device 610, a Hamming processing command may be provided by a host computing device 602 to a processor 614 via a host bus 606 For example, the host bus 606 may be a PCIe bus that couples the Hamming memory device 610 to the host computing device 602, such that the host computing device 602 may provide information to the Hamming memory device 610 from a user application, executing on a host processor, which utilizes Hamming distance calculations and generates the Hamming processing command. For example, the Hamming processing command, as generated by the user application, may specify that Hamming distance calculations regarding an image code of an image and an image code dataset, including a plurality of image codes, stored in the memory array 624 are to be performed; and, accordingly, requests, by virtue of the Hamming process command, that the Hamming logic 612 implement such calculations at the Hamming memory device 610. In the example, the Hamming process command may include the image code associated with the image. The image may be an image obtained from an image capture device, e.g., IoT device 604 or IoT device 608. Upon obtaining the Hamming processing command at the processor 614, the Hamming logic 612 may identify the Hamming processing command to provide the image code associated with the Hamming processing command to the I/O control unit 618. Accordingly, in various implementations, at block 202, the I/O control unit 618 obtains the image code associated with the Hamming process command.

Block 702 may be followed by block 704, such that the method further includes an operation, responsive to the Hamming processing command, to provide at least one memory access request for a plurality of memory addresses to obtain the plurality of stored image codes. In the example implementation of the Hamming memory device 610, the control logic 622, responsive to obtaining one or more control signals indicative of the Hamming process command, provides one or more memory access requests, including memory addresses of stored images codes (e.g., an image code dataset) at the memory array 624, to various memory access circuits to perform memory access operations. In the example, the Hamming logic 612 generates a plurality of memory addresses to read based on the Hamming processing command. The plurality of memory address are provided to the control logic 622 as data to read to the data register 626. In the example, each memory address is read to the data register 626 of the Hamming memory device 610 to obtain the plurality of stored image codes on the data register 626.

Block 704 may be followed by block 706, such that the method further includes an operation to compare each stored image code of the plurality of stored image codes to the image code associated with the Hamming processing command to calculate respective Hamming distances of a plurality of Hamming distances. In the example implementation of the Hamming memory device 610, the control logic 622 controls the data register 626 to calculate, at the data register 626, each respective Hamming distance using the image code associated with the Hamming processing command stored at the cache register 628 and the plurality of stored images codes at the data register 626. For example, the Hamming control logic 622 may execute executable instructions at the processor 614 to calculate respective Hamming distances for each image code of the dataset and the image code of the obtained image in accordance with Equation (1). Accordingly, each Hamming distance calculation is representative of the image code being compared to one of the plurality of stored image codes. The method 200 may end after completion of the block 206.

Figure 8:
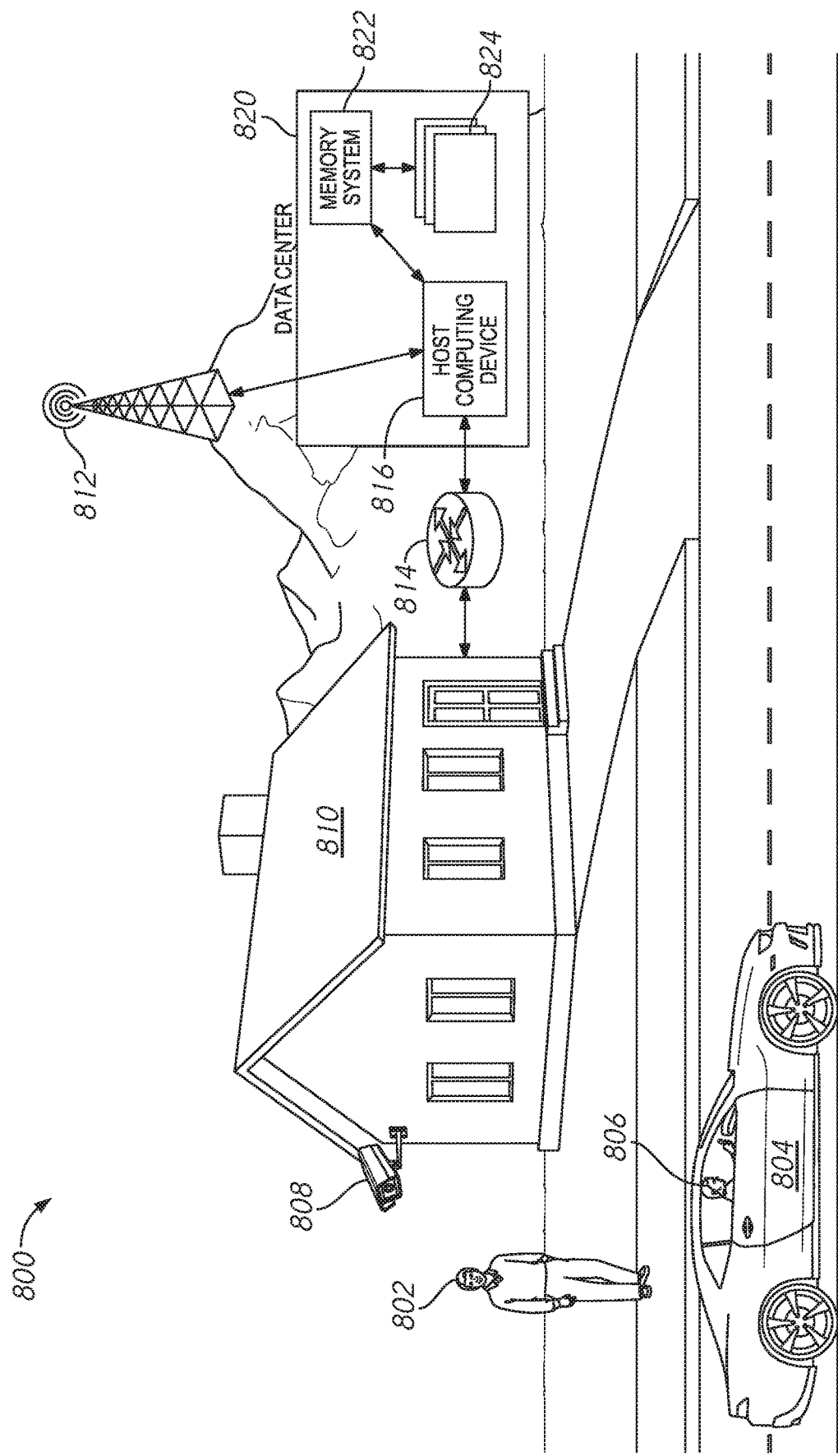
FIG. 8 illustrates an example of a system in accordance with aspects of the present disclosure.

FIG. 8 illustrates an example of a system 800 in accordance with aspects of the present disclosure. The system 800 includes a person 802 and a vehicle 804 with a person 806. System 800 also includes an IoT device 808 adhered to a house 810 and may be communicatively coupled to the house 810, e.g., via a wired connection (not depicted). The house 810, which may include a network endpoint, is coupled to a network switch 814 that couples the house 810 to data center 820. For example, the house 810 may be coupled to the network switch 814 via a wired (e.g., fiber optic, Ethernet) and/or wireless connection (e.g., Wi-Fi, Bluetooth). The IoT device 808 may also be communicatively coupled via a wireless connection to a wireless endpoint 812. For example, the wireless connection for the IoT device 808 may be a narrowband wireless communication connection in accordance with a Narrow Band IoT (NB-IoT) 5G standard. The wireless endpoint 812 is coupled via a wired connection (e.g., a fiber optic cable) to the data center 820. The data center 820 includes a host computing device 816 coupled to a memory system 822 that interacts with the memory devices 824.

The IoT device 808 may be an image capture device that obtains an image of the person 802, the vehicle 804, and/or the person 806 in the vehicle 804, e.g., as the person 802 or vehicle 804 approaches the house 810. In the example, the IoT device 808 may obtain an image of the person 802, e.g., to compare an image of that person 802 to an image of an individual in a dataset of convicted criminals (e.g., a dataset of images of convicted violent or sexual offenders). In the example, an image of the vehicle 804 may be obtained by the IoT device 808 to compare the image of that vehicle 804 (or a portion thereof, e.g., an image of the license plate) to a dataset of license plates, e.g., license plates associated with active Amber alerts (e.g., a government alert regarding an abducted or kidnapped child). Accordingly, the IoT device 808 may obtain images of individuals or vehicles, which are surrounding or approaching house 810. The house 810, having a network endpoint, may communicate the obtained images to a data center 820 via the network switch 814 or via a wireless connection to wireless endpoint 812.

Once the obtained image is provided to the data center 820, the host computing device 816 may generate a Hamming process request, e.g., in processing that obtained image on a neural network hosted by host computing device 816 and interacting with memory system 822. The memory system 822 may calculate Hamming distances of an image code of that obtained image with corresponding image codes of images in a relevant dataset stored on memory devices 824. Additionally or alternatively, the IoT device 808 may process that obtained image on a memory device(s) itself of the IoT device 808. In the example, the IoT device 808 includes a memory device implementing the Hamming memory device 610, e.g., to calculate Hamming distances of an image code of that obtained image with corresponding image codes of images in a relevant dataset stored on a memory device of the IoT device 808 itself. Advantageously, in processing Hamming processing commands on a memory device of the IoT device 808 itself, rate and amount of processing of datasets in a neural network at the IoT device 808 itself is increased, e.g., as compared to a conventional neural network processing system, which may first retrieve images or content from the memory devices to process images or content at a local cache or storage device, introducing delays into processing speed and processing rates.

The system 800 facilitates the processing of datasets that may be executed by neural networks hosted on host computing device 816 at the data center 820. In the example, the memory system 822 may implement a Hamming processing unit 108, e.g., using the memory devices 824; or, the memory system 822 may implement a memory controller 402. In either case, such implementation increases processing capacity of the calculations performed for the neural networks, e.g., as comparisons of image codes can be performed "closer" to the memory devices 824 by implementing the memory system 822 as a processing unit having memory devices 824 (e.g., as Hamming processing unit 108) or as a memory controller (e.g., memory controller 402) coupled to the memory devices 824. In the example, the memory system 822 is closer to the memory devices 824 as compared to, for example, a conventional system which may retrieve and store datasets from the memory devices 824 on the host computing device 816 for processing of datasets or a conventional system which may retrieve and store images to be processed at the house 810 network endpoint from the data center 820. In the implementation of memory system 822 being a Hamming processing unit 108, the comparisons of image codes are performed at the Hamming processing unit 108 having the memory devices 124 via controller buses 120 and respective memory buses 122. For example, the memory system 822 may implement the method 200 or method 300, as a Hamming processing unit 108 having the memory devices 824, to obtain a set of results regarding an image obtained by the IoT device 808. As another example, the memory system 822 may implement the method 500 at the Hamming control logic 420 of the Hamming processing unit 108 having the memory devices 824, to obtain a set of results regarding an image obtained by the IoT device 808.

Advantageously, in distributing the Hamming processing requests to the memory devices 824 when implementing the memory system 822 as Hamming processing unit 108 or memory controller 402, the memory system 822 facilitates an increased rate of processing of datasets by using available memory buses coupled to the memory system 822, such as memory buses operating in accordance with an NVMe protocol.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
obtaining, via a host bus at a cache of a memory controller, an image code of a Hamming processing request to calculate a Hamming distance among a plurality of images and an image associated with an image code from a host computing device;
obtaining, at the cache of the memory controller, data representative of a plurality of images from a plurality of memory devices based on the Hamming processing request; and
comparing, at the memory controller, data for at least one image of the plurality of images to the image code to calculate a respective Hamming distance of a plurality of Hamming distances by:
hashing at least one image of the plurality of images to generate at least one hashed image code for that respective image; and:
for at least one hashed image code of the plurality of images:
adding respective bits of the image code to bits of the at least one hashed image code to generate a respective first bit result;
performing a modulo-2 operation on each respective bit result to generate a respective second bit result; and
summing the respective second bit results to calculate the respective Hamming distance of the plurality of Hamming distances.

2. The method of claim 1, further comprising:
responsive to the Hamming processing request, providing, from the memory controller, at least one memory access request to the plurality of memory devices to obtain the plurality of images.

3. The method of claim 1, wherein obtaining, at the cache of the memory controller, the plurality of images from the plurality of memory devices comprises obtaining respective images of the plurality of images via a plurality of memory buses coupling the plurality of memory devices to the memory controller.

4. The method of claim 1, further comprising:
performing error correction on the plurality of images to provide the plurality of images as error-corrected after being obtained from the plurality of memory devices.

5. The method of claim 4, wherein the error correction comprises low-density parity-check correction.

6. The method of claim 1, further comprising:
obtaining an image from an Internet of Things (IoT) computing device; and
generating the image code based on the image using a hash.

7. The method of claim 6, wherein the IoT computing device comprises at least one of a camera, a smartphone device, or an image capture device.

8. A memory controller comprising:
Hamming control logic configured to receive a Hamming processing request over a host bus and further configured to calculate a plurality of Hamming distances among a plurality of images and an image associated with an image code from a host computing device; and
a cache configured to store an image code associated with the Hamming processing request,
wherein the Hamming control logic further configured to compare at least one image of the plurality of images to the image code to calculate a respective Hamming distance of the plurality of Hamming distances by:
hashing an image of the plurality of images to generate a hashed image code for the image;
adding respective bits of the image code to bits of the hashed image code to generate a respective first bit result;
performing a modulo-2 operation on each respective bit result to generate a respective second bit result; and
summing the respective second bit results to calculate the respective Hamming distance of the plurality of Hamming distances.

9. The memory controller of claim 8, further comprising:
a memory interface configured to provide a plurality of memory access requests to a plurality of memory devices, wherein the Hamming control logic is further configured to generate at least one memory access request of the plurality of memory access requests based on the Hamming processing request to obtain the plurality of images from the plurality of memory devices.

10. The memory controller of claim 9, wherein, responsive to the at least one memory access request, the memory interface is further configured to provide the plurality of images to the cache.

11. The memory controller of claim 10, further comprising:
an error correction unit configured to error correct data obtained from the plurality of memory devices,
wherein the cache is further configured to provide the plurality of images to the error correction unit to error correct the plurality of images and to receive the plurality of images from the error correction unit as error-corrected.

12. The memory controller of claim 11, wherein the error correction unit comprises a low-density parity-check correction unit.

13. The memory controller of claim 8, further comprising:
a host interface configured to receive the Hamming processing request from the host computing device and further configured to provide the image code associated with the Hamming processing request to the cache for storage of the image code.

14. The memory controller of claim 13, wherein the Hamming control logic is further configured to generate image processing results based on the calculated plurality of Hamming distances, and is further configured to provide, via the host interface, the image processing results to the host computing device for use in a neural network hosted on the host computing device.

15. The memory controller of claim 14, wherein the image processing results comprises a set of neural network results indicative of certain images of the plurality of images.

16. An apparatus comprising:
a host computing device configured to obtain an image from an IoT computing device and to provide a Hamming processing request based on the image;
a plurality of memory devices; and
a memory controller comprising:

a host interface configured to receive the Hamming processing request from the host computing device;

a cache configured to store an image code associated with the Hamming processing request; and Hamming control logic configured to receive the Hamming processing request over a host bus and further configured to calculate a plurality of Hamming distances among a plurality of images and an image associated with the image code by:

hashing an image of the plurality of images to generate a hashed image code for the image;

adding respective bits of the image code to bits of the hashed image code to generate a respective first bit result;

performing a modulo-2 operation on each respective bit result to generate a respective second bit result; and summing the respective second bit results to calculate the respective Hamming distance of the plurality of Hamming distances.

17. The apparatus of claim 16, further comprising:

a plurality of memory buses coupling the plurality of memory devices to the memory controller, wherein the Hamming control logic is configured to provide a plurality of memory access requests to the plurality of memory devices via the plurality of memory buses.

18. The apparatus of claim 16, wherein the plurality of memory devices comprise NAND memory devices, wherein the memory controller comprises an NVMe memory controller, and wherein the host bus comprises an NVMe bus.

* * * * *